United States Patent
Gao et al.

(10) Patent No.: US 11,497,003 B2
(45) Date of Patent: Nov. 8, 2022

(54) INFORMATION TRANSMISSION METHOD, TERMINAL AND NETWORK DEVICE

(71) Applicant: CHINA ACADEMY OF TELECOMMUNICATIONS TECHNOLOGY, Beijing (CN)

(72) Inventors: Xuejuan Gao, Beijing (CN); Tony Ekpenyong, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 175 days.

(21) Appl. No.: 16/961,863

(22) PCT Filed: Dec. 19, 2018

(86) PCT No.: PCT/CN2018/122003
§ 371 (c)(1),
(2) Date: Jul. 13, 2020

(87) PCT Pub. No.: WO2019/137168
PCT Pub. Date: Jul. 18, 2019

(65) Prior Publication Data
US 2020/0359374 A1    Nov. 12, 2020

(30) Foreign Application Priority Data

Jan. 12, 2018   (CN) .......................... 201810032643.2

(51) Int. Cl.
*H04W 72/04*    (2009.01)
*H04W 72/12*    (2009.01)

(52) U.S. Cl.
CPC .... *H04W 72/0413* (2013.01); *H04W 72/1268* (2013.01)

(58) Field of Classification Search
None
See application file for complete search history.

(56) References Cited

U.S. PATENT DOCUMENTS

| 2010/0195575 A1 | 8/2010 | Papasakellariou et al. |
| 2012/0320826 A1 | 12/2012 | Kim et al. |
| 2013/0094410 A1 | 4/2013 | Yang et al. |

(Continued)

FOREIGN PATENT DOCUMENTS

| CN | 102158326 A | 8/2011 |
| CN | 103178926 A | 6/2013 |

(Continued)

OTHER PUBLICATIONS

R1-1721614 "Summary of Contribution of PUCCH Structure for Short Duration" 3GPP WG1 #91 Reno Nov. 27-Dec. 1, 2017 (Year: 2017).*

(Continued)

*Primary Examiner* — Basil Ma
(74) *Attorney, Agent, or Firm* — Ladas & Parry, LLP

(57) ABSTRACT

An information transmission method, a terminal and a network device are provided. The information transmission method includes: determining a plurality of PUCCH resources corresponding to UCI; determining a target PUCCH resource for the UCI transmission from the plurality of PUCCH resources, according to Scheduling Request (SR) states of a plurality of SR configurations; and sending the UCI through the target PUCCH resource.

20 Claims, 2 Drawing Sheets

(56) References Cited

U.S. PATENT DOCUMENTS

| | | | |
|---|---|---|---|
| 2013/0279454 A1 | 10/2013 | Kim et al. | |
| 2014/0301324 A1 | 10/2014 | Cheng et al. | |
| 2019/0261391 A1* | 8/2019 | Kundu | H04W 72/0446 |
| 2020/0170005 A1* | 5/2020 | Matsumura | H04L 1/1861 |

FOREIGN PATENT DOCUMENTS

| | | |
|---|---|---|
| CN | 103796318 A | 5/2014 |
| CN | 105187174 A | 12/2015 |
| EP | 3684125 A1 | 7/2020 |
| WO | 2010133042 A1 | 11/2010 |
| WO | 2012036533 A1 | 3/2012 |

OTHER PUBLICATIONS

International Search Report from PCT/CN2018/122003, dated Mar. 20, 2019, with English translation provided by WIPO.

Written Opinion of the International Searching Authority from PCT/CN2018/122003, dated Mar. 20, 2019, with English translation provided by WIPO.

International Preliminary Report on Patentability from PCT/CN2018/122003, dated Jul. 14, 2020, with English translation provided by WIPO.

Partial Supplementary European Search Report from EP 18899254.9, dated Feb. 9, 2021.

"Procedures for UL Transmissions", Rl-1717665, 3GPP TSG RAN WG1 #90bis, Prague, CZ, Oct. 9-13, 2017.

"Summary of open issues for AI 7.3.3.4", R1-1718815, 3GPP TSG RAN WG1 #90bis, Prague, CZ, Oct. 9-13, 2017.

"Summary of Short PUCCH structure (7.3.2.1)", R1-1718862, 3GPP TSG RAN WG1 Meeting AH_NR#3, Nagoya, Japan, Sep. 18-21, 2017.

"UL data transmission procedures", R1-1720690, 3GPP TSG RAN WG1 Meeting 91, Reno, USA, Nov. 27-Dec. 1, 2017.

"Remaining issues on Short PUCCH for UCI of up to 2 bits", R1-1720875, 3GPP TSG RAN WG1 Meeting 91, Reno, USA, Nov. 27-Dec. 1, 2017.

Extended European Search Report from EP app. No. 18899254.9, dated Jun. 29, 2021, all pages.

Examination Report from IN app. No. 202027033641, dated Sep. 9, 2021, all pages.

"Summary of Contributions on PUCCH Structure for Short Duration", R1-1721614, 3GPP TSG RAN WG1 Meeting #91, Reno, Nevada, Nov. 27-Dec. 1, 2017, all pages.

First Office Action for Korean Patent Application 10-2020-7023025 dated Apr. 5, 2022.

"Remaining Issues for Short PUCCH with UCI of more than 2 Bits," 3GPP TSG RAN WG1 Meeting 91, R1-1720327, Reno, USA, Nov. 27-Dec. 1, 2017, Agenda Item: 7.3.2.1.2, Source: Samsung.

* cited by examiner

INFORMATION TRANSMISSION METHOD, TERMINAL AND NETWORK DEVICE

CROSS REFERENCE TO RELATED APPLICATIONS

The present application is the U.S. national phase of PCT Application No. PCT/CN2018/122003 filed on Dec. 19, 2018, which claims a priority to Chinese patent application No. 201810032643.2 filed on Jan. 12, 2018, the disclosures of which are incorporated herein by reference in their entireties.

TECHNICAL FIELD

The present disclosure relates to the field of communications, and in particular, to an information transmission method, a terminal and a network device.

BACKGROUND

In a new $5^{th}$ Generation New RAT (5G NR) system, five Physical Uplink Control Channel (PUCCH) formats (format) are defined, i.e., PUCCH format 0, 1, 2, 3, 4, and different PUCCH format have different transmission schemes. The PUCCH is configured to transmit Uplink Control Information (UCI) including Hybrid Automatic Repeat reQuest-ACKnowledgement (HARQ-ACK), Channel State Information (CSI), and Scheduling Request (SR). Where PUCCH format 0 or 1 is configured to carry no more than 2 bits of UCI transmission and PUCCH format 2, 3 or 4 is configured to carry no more than 2 bits of UCI transmission. The HARQ-ACK may be configured to use any of the five format transmissions, the CSI may be configured to use at least PUCCH format 2, 3, or 4 transmissions, and the SR may be configured to use at least PUCCH format 0 or 1 transmissions.

PUCCH format 2, 3, and 4 are transmitted using coding and rate matching, that is, the UCI to be transmitted is mapped to a resource other than DMRS on the configured PUCCH format resource after channel coding and rate matching. When at least one of HARQ-ACK and CSI is configured for transmission using PUCCH format 2, 3 or 4, if at least one of HARQ-ACK and CSI overlaps the transmission occasion of SR at the time domain transmission location, 1-bit information may be configured to represent the state of SR, for example, the bit information has a value of 1 for positive (positive) SR, the bit information has a value of 0 for negative (negative) SR, and the 1-bit information is concatenated with the bit information of HARQ-ACK and CSI for joint encoding and simultaneous transmission on resources of PUCCH format 2, 3 or 4.

In the 5G NR system, it is also supported to configure a plurality of SR configurations for a terminal, different SR configurations corresponding to different traffic types and/or transmission requirements and/or logical channels, different parameters of different SR configurations, such as SR resources, periods, and the like. The transmission opportunities of the plurality of SR configurations may overlap. When the transmission opportunities of the plurality of SR configurations overlap, there are a plurality of SR configurations in the transmission opportunities of one SR, which SR the terminal transmits is triggered by the high layer of the terminal, and the high layer triggers only one of the SRs (the triggered SR is positive SR). Therefore, the terminal transmits the triggered SR only on the SR resource corresponding to the triggered SR in the SR transmission opportunities. The network device determines which SR the terminal transmits by means of blind detection on SR resources corresponding to each of the plurality of SR configurations configured for the terminal, and performs reasonable uplink scheduling according to the blind detection SR.

However, when the terminal has a plurality of SR configurations and the transmission opportunities of the plurality of SRs overlap, it is not possible to determine which SR in the plurality of SR configurations is transmitted simultaneously with the other UCI when the SR transmission and the other UCI transmission exist simultaneously in the overlapping SR transmission opportunities.

SUMMARY

An information transmission method is provided in an embodiment of the present disclosure, applied to a terminal, including:
  determining a plurality of Physical Uplink Control Channel (PUCCH) resources corresponding to Uplink Control Information (UCI);
  determining a target PUCCH resource for a UCI transmission from the plurality of PUCCH resources, according to Scheduling Request (SR) states of a plurality of SR configurations; and
  sending the UCI through the target PUCCH resource.

Optionally, the determining the plurality of PUCCH resources corresponding to the UCI includes:
  determining the plurality of PUCCH resources corresponding to the UCI based on an initial cyclic shift parameter configured for the UCI.

Optionally, the determining the plurality of PUCCH resources corresponding to the UCI based on the initial cyclic shift parameter configured for the UCI includes:
  determining M+1 cyclic shift parameter sets based on the initial cyclic shift parameter configured for the UCI;
  where each cyclic shift parameter set includes a plurality of cyclic shift parameters, and each cyclic shift parameter in each cyclic shift parameter set corresponds to a feedback state of the UCI; each cyclic shift parameter in the cyclic shift parameter sets is determined by performing a preset offset based on the initial cyclic shift parameter;
  where M is an integer greater than 1, one cyclic shift parameter set of the M+1 cyclic shift parameter sets is for the UCI transmission in the case that the SR states of the plurality of SR configurations are negative SR, and each cyclic shift parameter set of the rest of the M+1 cyclic shift parameter sets is for the UCI transmission in the case that the SR state of the SR configuration corresponding to the each cyclic shift parameter set is positive SR.

Optionally, the determining the target PUCCH resource for the UCI transmission from the plurality of PUCCH resources according to the SR states of the plurality of SR configurations includes:
  in the case that the SR state of each of the plurality of SR configurations is negative SR, determining the cyclic shift parameter set corresponding to negative SR among the M+1 cyclic shift parameter sets as a target cyclic shift parameter set for the UCI transmission;
  in the case that the SR state of one SR configuration of the plurality of SR configurations is positive SR, determining the cyclic shift parameter set corresponding to the one SR configuration among the M+1 cyclic shift parameter sets as a target cyclic shift parameter set for the UCI transmission.

Optionally, the determining the plurality of PUCCH resources corresponding to the UCI includes:

determining M+1 PUCCH resources corresponding to the UCI according to a PUCCH resource indication field in Downlink Control Information (DCI); or determining M+1 PUCCH resources from preconfigured J PUCCH resources as the M+1 PUCCH resources, where J is an integer greater than or equal to M+1;

where M is an integer greater than 1, one PUCCH resource of the M+1 PUCCH resources is for the UCI transmission in the case that the SR states of the plurality of SR configurations are negative SR, and each PUCCH resource of the rest of the M+1 PUCCH resources is for the UCI transmission in the case that the SR state of the SR configuration corresponding to the each PUCCH resource is positive SR.

Optionally, the determining the M+1 PUCCH resources corresponding to the UCI according to the PUCCH resource indication field in the DCI includes:

determining the M+1 PUCCH resources from a preset PUCCH resource set according to the PUCCH resource indication field in the DCI.

Optionally, the determining the M+1 PUCCH resources from the preset PUCCH resource set according to the PUCCH resource indication field in the DCI includes:

in the case that the PUCCH resource indication field indicates that the UCI corresponds to a kth PUCCH resource in the PUCCH resource set, determining the kth PUCCH resource and a ((k+i) mod N)th PUCCH resource in the PUCCH resource set as the M+1 PUCCH resources, or determining the kth PUCCH resource and a ((k+4+i) mod N)th PUCCH resource in the PUCCH resource set as the M+1 PUCCH resources;

where i is an integer greater than 0 and less than or equal to M, and N is a quantity of PUCCH resources in the PUCCH resource set.

Optionally, the determining the M+1 PUCCH resources corresponding to the UCI according to the PUCCH resource indication field in the DCI includes:

in the case that the PUCCH resource indication field indicates one PUCCH resource subset in the PUCCH resource set, where the PUCCH resource subset includes more than one PUCCH resource;

in the case that a quantity of the PUCCH resources in the PUCCH resource subset is less than M+1, determining the M+1 PUCCH resources from the one PUCCH resource subset and the subsequent one or more PUCCH resource subsets, in an order from the PUCCH resources in the one PUCCH resource subset to the PUCCH resources in the subsequent one or more PUCCH resource subsets;

in the case that the quantity of the PUCCH resources in the PUCCH resource subset is equal to M+1, determining the PUCCH resources in the PUCCH resource subset as the M+1 PUCCH resources;

in the case that the quantity of the PUCCH resources in the PUCCH resource subset is greater than M+1, determining the M+1 PUCCH resources from the PUCCH resource subset.

Optionally, the J PUCCH resources are configured by a high layer signaling, or the J PUCCH resources are determined from a plurality of PUCCH resource sets preconfigured by a high layer signaling according to a bit quantity of the UCI.

Optionally, a correspondence between the M+1 cyclic shift parameter sets and the negative SR state and the positive SR state of each of the plurality of SR configurations is predefined, or configured by a network device, or determined according to a preset rule.

Optionally, a correspondence between the M+1 cyclic shift parameter sets and the negative SR state and the positive SR state of each of the plurality of SR configurations is predefined, or configured by a network device, or determined according to a preset rule.

Optionally, the determining the target PUCCH resource for the UCI transmission from the M+1 PUCCH resources according to the SR states of the plurality of SR configurations includes:

in the case that the SR state of each of the plurality of SR configurations is negative SR, determining the PUCCH resource corresponding to negative SR in the M+1 PUCCH resources as the target PUCCH resource for the UCI transmission;

in the case that the SR state of one SR configuration of the plurality of SR configurations is positive SR, determining the PUCCH resource corresponding to the one SR configuration in the M+1 PUCCH resources as the target PUCCH resource for the UCI transmission.

Optionally, the M is determined according to one of:

a maximum quantity of SR configurations supported by the terminal;

a quantity of SR configurations configured for the terminal;

a quantity of SR configurations overlapped in a same SR transmission occasion configured for the terminal; and a quantity indicated through a configuration signaling sent by a network device.

Optionally, the UCI includes at least one of:

a Hybrid Automatic Repeat reQuest-ACKnowledgement (HARQ-ACK) and Channel State Information (CSI).

Optionally, the method further includes:

determining the plurality of PUCCH resources corresponding to the UCI, in the case that:

a current time is a transmission occasion of SR; or a current time is a transmission occasion of SR, and there exist a plurality of SR configurations in the transmission occasion.

A terminal is provided in an embodiment of the present disclosure, including a transceiver, a memory, a processor and a program stored in the memory and executable on the processor, where the processor is configured to execute the computer program to perform the information transmission method hereinabove.

A terminal is provided in an embodiment of the present disclosure, including:

a first determining module, configured to determine a plurality of Physical Uplink Control Channel (PUCCH) resources corresponding to Uplink Control Information (UCI);

a second determining module, configured to determine a target PUCCH resource for the UCI transmission from the plurality of PUCCH resources, according to Scheduling Request (SR) states of a plurality of SR configurations; and a first transmitting module, configured to send the UCI through the target PUCCH resource.

An information transmission method is provided in an embodiment of the present disclosure, applied to a network device, including:

determining a plurality of Physical Uplink Control Channel (PUCCH) resources corresponding to Uplink Control Information (UCI); and detecting the UCI in the plurality of PUCCH resources, and determining Scheduling Request (SR) states of a plurality of SR configurations based on the PUCCH resource of the detected UCI.

Optionally, the determining the plurality of PUCCH resources corresponding to the UCI includes:

determining the plurality of PUCCH resources corresponding to the UCI based on an initial cyclic shift parameter configured for the UCI.

Optionally, the determining the plurality of PUCCH resources corresponding to the UCI based on the initial cyclic shift parameter configured for the UCI includes:

determining M+1 cyclic shift parameter sets based on the initial cyclic shift parameter configured for the UCI;

where each cyclic shift parameter set includes a plurality of cyclic shift parameters, and each cyclic shift parameter in each cyclic shift parameter set corresponds to a feedback state of the UCI; each cyclic shift parameter in the cyclic shift parameter sets is determined by performing a preset offset based on the initial cyclic shift parameter;

where M is an integer greater than 1, one cyclic shift parameter set of the M+1 cyclic shift parameter sets is for the UCI transmission in the case that the SR states of the plurality of SR configurations are negative SR, and each cyclic shift parameter set of the rest of the M+1 cyclic shift parameter sets is for the UCI transmission in the case that the SR state of the SR configuration corresponding to the each cyclic shift parameter set is positive SR.

Optionally, the detecting the UCI in the plurality of PUCCH resource and determining the SR states of the plurality of SR configurations based on the PUCCH resource of the detected UCI includes:

detecting the UCI using each cyclic shift parameter in the M+1 cyclic shift parameter sets;

in the case that the UCI is detected using the cyclic shift parameter in the cyclic shift parameter set corresponding to negative SR, determining that the SR state of each of the plurality of SR configurations is negative SR;

in the case that the UCI is detected using the cyclic shift parameter in the cyclic shift parameter set corresponding to one SR configuration of the plurality of SR configurations, determining that the SR state of the one SR configuration of the plurality of SR configurations is positive SR.

Optionally, the determining the plurality of PUCCH resources corresponding to the UCI includes:

determining M+1 PUCCH resources corresponding to the UCI according to a PUCCH resource indication field in Downlink Control Information (DCI); or determining M+1 PUCCH resources from preconfigured J PUCCH resources as the M+1 PUCCH resources, where J is an integer greater than or equal to M+1;

where M is an integer greater than 1, one PUCCH resource of the M+1 PUCCH resources is for the UCI transmission in the case that the SR states of the plurality of SR configurations are negative SR, and each PUCCH resource of the rest of the M+1 PUCCH resources is for the UCI transmission in the case that the SR state of the SR configuration corresponding to the each PUCCH resource is positive SR.

Optionally, the determining the M+1 PUCCH resources corresponding to the UCI according to the PUCCH resource indication field in the DCI includes:

determining the M+1 PUCCH resources from a preset PUCCH resource set according to the PUCCH resource indication field in the DCI.

Optionally, the determining the M+1 PUCCH resources from the preset PUCCH resource set according to the PUCCH resource indication field in the DCI includes:

in the case that the PUCCH resource indication field indicates that the UCI corresponds to a kth PUCCH resource in the PUCCH resource set, determining the kth PUCCH resource and a ((k+i) mod N)th PUCCH resource in the PUCCH resource set as the M+1 PUCCH resources, or determining the kth PUCCH resource and a ((k+4+i) mod N)th PUCCH resource in the PUCCH resource set as the M+1 PUCCH resources;

where i is an integer greater than 0 and less than or equal to M, and N is a quantity of PUCCH resources in the PUCCH resource set.

Optionally, the determining the M+1 PUCCH resources corresponding to the UCI according to the PUCCH resource indication field in the DCI includes:

in the case that the PUCCH resource indication field indicates one PUCCH resource subset in the PUCCH resource set, where the PUCCH resource subset includes more than one PUCCH resource;

in the case that a quantity of the PUCCH resources in the PUCCH resource subset is less than M+1, determining the M+1 PUCCH resources from the one PUCCH resource subset and the subsequent one or more PUCCH resource subsets, in an order from the PUCCH resources in the one PUCCH resource subset to the PUCCH resources in the subsequent one or more PUCCH resource subsets;

in the case that the quantity of the PUCCH resources in the PUCCH resource subset is equal to M+1, determining the PUCCH resources in the PUCCH resource subset as the M+1 PUCCH resources;

in the case that the quantity of the PUCCH resources in the PUCCH resource subset is greater than M+1, determining the M+1 PUCCH resources from the PUCCH resource subset.

Optionally, the J PUCCH resources are configured by a high layer signaling, or the J PUCCH resources are determined from a plurality of PUCCH resource sets preconfigured by a high layer signaling according to a bit quantity of the UCI.

Optionally, a correspondence between the M+1 cyclic shift parameter sets and the negative SR state and the positive SR state of each of the plurality of SR configurations is predefined, or configured by the network device, or determined according to a preset rule.

Optionally, a correspondence between the M+1 cyclic shift parameter sets and the negative SR state and the positive SR state of each of the plurality of SR configurations is predefined, or determined by the network device and notified to a terminal, or determined according to a preset rule.

Optionally, the detecting the UCI in the M+1 PUCCH resources and determining the SR states of the plurality of SR configurations based on the PUCCH resource of the detected UCI includes:

in the case that the UCI is detected on the PUCCH resource corresponding to negative SR in the M+1 PUCCH resources, determining that the SR state of each of the plurality of SR configurations is negative SR;

in the case that the UCI is detected on the PUCCH resource corresponding to one SR configuration of the plurality of SR configurations in the M+1 PUCCH resources, determining that the SR state of the one SR configuration of the plurality of SR configurations is positive SR.

Optionally, the M is determined according to one of:

a maximum quantity of SR configurations supported by a terminal;

a quantity of SR configurations configured for the terminal;

a quantity of SR configurations overlapped in a same SR transmission occasion configured for the terminal; and a quantity indicated through a configuration signaling sent by the network device.

Optionally, the UCI includes at least one of:

a Hybrid Automatic Repeat reQuest-ACKnowledgement (HARQ-ACK) and Channel State Information (CSI).

Optionally, the method further includes:

determining the plurality of PUCCH resources corresponding to the UCI, in the case that:

a current time is a transmission occasion of SR; or a current time is a transmission occasion of SR, and there exist a plurality of SR configurations in the transmission occasion.

A network device is provided in an embodiment of the present disclosure, including a transceiver, a memory, a processor and a program stored in the memory and executable on the processor, where the processor is configured to execute the program to perform the information transmission method hereinabove.

A network device is provided in an embodiment of the present disclosure, including:

a first processing module, configured to determine a plurality of Physical Uplink Control Channel (PUCCH) resources corresponding to Uplink Control Information (UCI); and a second processing module, configured to detect the UCI in the plurality of PUCCH resources, and determining Scheduling Request (SR) states of a plurality of SR configurations based on the PUCCH resource of the detected UCI.

A computer readable storage medium is provided in an embodiment of the present disclosure, where a computer program is stored in the computer readable storage medium, where the computer program is executed by a processor to perform the information transmission method hereinabove.

A computer readable storage medium is provided in an embodiment of the present disclosure, where a computer program is stored in the computer readable storage medium, where the computer program is executed by a processor to perform the information transmission method hereinabove.

DETAILED DESCRIPTION

Figure 1:
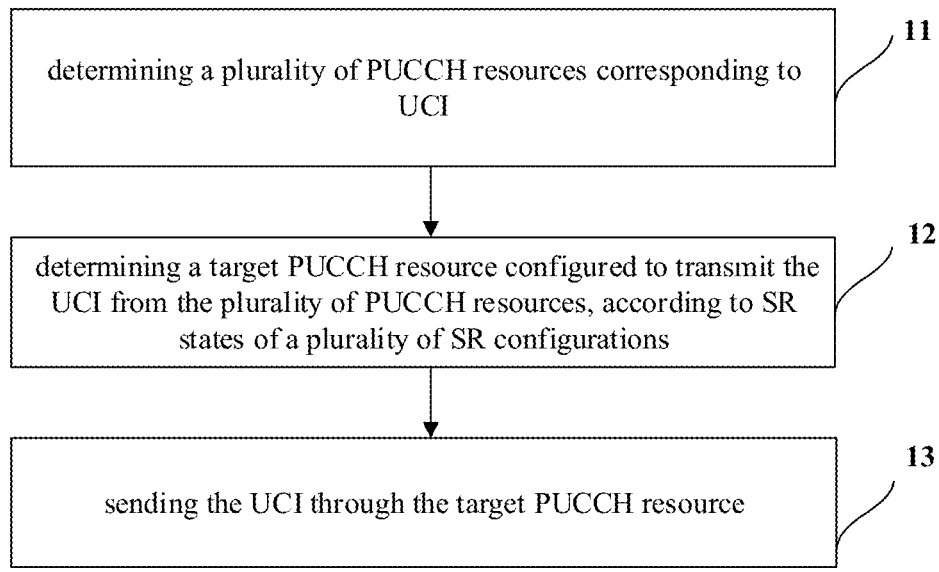
FIG. 1 is a flow chart of an information transmission method at a terminal side in an embodiment of the present disclosure.

In order that the technical problems, technical solutions, and advantages to be solved by the present disclosure may be made clearer, reference will now be made in detail to the accompanying drawings and specific examples. In the following description, specific details such as specific configurations and components are provided merely to facilitate a thorough understanding of the embodiments of the present disclosure. Accordingly, it will be apparent to those skilled in the art that various changes and modifications may be made to the embodiments described herein without departing from the scope and spirit of the disclosure. In addition, descriptions of known functions and configurations are omitted for clarity and brevity.

It is to be understood that reference throughout the specification to "one embodiment" or "an embodiment" means that a particular feature, structure, or characteristic associated with the embodiment is included in at least one embodiment of the present disclosure. Thus, the appearances of "in one embodiment" does not mean the same embodiment Furthermore, these specific features, structures, or characteristics may be combined in any suitable manner in one or more embodiments.

In the various embodiments of the present disclosure, it is to be understood that the magnitude of the sequence numbers of the processes described below is not intended to mean the order of execution, and that the order of execution of the processes should be determined by their function and intrinsic logic, and should not constitute any limitation on the implementation of the embodiments of the present disclosure.

Additionally, the terms "system" and "network" are used interchangeably herein.

In the embodiments provided herein, it is to be understood that "B corresponding to A" means that B is associated with A, from which B can be determined. It should also be understood, however, that determining B from A does not mean determining B from A only, but may also determine B from A and/or other information.

In the embodiment of the present disclosure, the network device is not limited in form, and may be an access network including a macro base station (Macro Base Station), a micro base station (Pico Base Station), a Node B (call of a 3G mobile base station), an enhanced base station (eNB), a home enhanced base station (Femto eNB or Home eNode B or Home eNB or HeNB), a relay station, an access point, a RRU (Remote Radio Unit), and a RRH (Remote Radio Head). The terminal may be a mobile phone (or handset), or other device capable of transmitting or receiving wireless signals, including a user equipment, a personal digital assistant (PDA), a wireless modem, a wireless communication device, a handheld device, a laptop computer, a cordless telephone, a wireless local loop (WLL) station, a CPE (Customer Premise Equipment) or a mobile intelligent hotspot capable of converting a mobile signal into a WiFi signal, a smart home appliance, or other device capable of spontaneously communicating with a mobile communication network without operation of a person.

Specifically, an information transmission method is provided in an embodiment of the present disclosure, which solves a problem in the prior art that when a terminal has simultaneous SR transmission and other UCI transmission, it is impossible to determine which SR in a plurality of SR configurations is simultaneously transmitted with other UCI.

As shown in FIG. 1, an information transmission method is provided in an embodiment of the present disclosure, including the following steps 11 to 13.

Step 11: determining a plurality of Physical Uplink Control Channel (PUCCH) resources corresponding to Uplink Control Information (UCI).

The plurality of PUCCH resources is optionally M+1 PUCCH resources. M is an integer greater than 1, one PUCCH resource of the M+1 PUCCH resources is for the UCI transmission in the case that the SR states of the plurality of SR configurations are negative SR, and each PUCCH resource of the rest of the M+1 PUCCH resources is for the UCI transmission in the case that the SR state of the SR configuration corresponding to the each PUCCH resource is positive SR. That is, one PUCCH of the M+1 PUCCH resources corresponds to negative SR, and the rest M PUCCH resources correspond to a state in which each SR in the SR configuration is configured as positive SR.

Optionally, the M is determined according to one of: a maximum quantity of SR configurations supported by the terminal; a quantity of SR configurations configured for the terminal; a quantity of SR configurations overlapped in a same SR transmission occasion configured for the terminal; and a quantity indicated through a configuration signaling sent by a network device. That is, M is the maximum number of multiple SR configurations configured for the same terminal supported in the system and (in this case, if the number of actually configured SR configurations of the terminal is less than the maximum value, it is equivalent to that there are PUCCH resources without corresponding actual SR configurations among M+1 PUCCH resources, and these resources will not be selected and used by the terminal); or M is the number of multiple SR configurations configured for the same terminal; or M is a number of SR configurations in which transmission opportunities overlap among a plurality of SR configurations configured for the same terminal; or M is notified to the terminal by the network side through configuration signaling.

Assume that the terminal has two SR configurations, SR1 and SR2, respectively, and the transmission opportunities of SR1 and SR2 overlap at time 1 according to the configuration periods and offset values of SR1 and SR2. If there are other UCI transmissions at time 1, M=2 is determined according to the number of configured SR configurations, the number of overlapping SR configurations at the same time, or the configuration information sent by the network device, that is, M+1=3 PUCCH resources are required. If SR1 is positive SR at time 1, positive SR1 needs to be transmitted.

Step 12: determining a target PUCCH resource for the UCI transmission from the plurality of PUCCH resources, according to Scheduling Request (SR) states of a plurality of SR configurations.

Since one of the plurality of PUCCH resources corresponds to negative SR, the rest of PUCCH resources correspond to a state in which each SR in the SR configuration is configured as positive SR. Therefore, after determining the SR state of the SR configuration, the terminal may determine the corresponding PUCCH resource for the target PUCCH resource to implicitly indicate the SR state of the SR configuration.

Step 13: sending the UCI through the target PUCCH resource.

The terminal sends the UCI to the network device through the target PUCCH resources, and the network device determines the SR state configured by the terminal according to the detected PUCCH resources of the UCI by detecting a plurality of PUCCH resources, thereby ensuring correct uplink scheduling of the terminal by the network device.

The information transmission method will be further described below with reference to a specific implementation. In an alternative embodiment, step 11 may be accomplished by, but is not limited to:

Method 1: determining the plurality of PUCCH resources corresponding to the UCI based on an initial cyclic shift parameter configured for the UCI.

In some embodiments of the present disclosure, M+1 sets of cyclic shift parameters are determined based on the initial cyclic shift parameters configured for the UCI. Each cyclic shift parameter set includes a plurality of cyclic shift parameters, and each cyclic shift parameter in each cyclic shift parameter set corresponds to a feedback state of one UCI; Each cyclic shift parameter in the cyclic shift parameter set is determined by performing a preset offset based on the initial cyclic shift parameter, one cyclic shift parameter corresponding to one PUCCH resource. In this manner, where M is an integer greater than 1, one of the M+1 cyclic shift parameter sets is for the UCI transmission when the SR state of the plurality of SR configurations is negative SR, and each of the rest of cyclic shift parameter sets of the plurality of cyclic shift parameter sets is for the UCI transmission when the SR state of one of the plurality of SR configurations corresponding to the cyclic shift parameter set is positive SR. Specifically, the terminal determines M+1 sets of cyclic shift parameter sets according to the initial cyclic shift parameter $CS_{initial}$ configured for the UCI, where each cyclic shift parameter corresponds to one PUCCH resource, and each set of cyclic shift parameter sets is obtained by a preset offset based on the initial cyclic shift parameter, where all the cyclic shift parameters in the cyclic shift parameter sets correspond to cyclic shifts in the same RB.

In this case, when the terminal transmits the UCI through the target PUCCH resource, one cyclic shift parameter corresponding to the feedback state of the UCI in the target cyclic shift parameter set is selected according to the feedback states (ACK and NACK) of the UCI; the UCI is transmitted using the one cyclic shift parameter; accordingly, the network device side can determine the feedback state of the UCI by detecting the UCI using which cyclic shift parameter in the cyclic shift parameter set. For example, the UCI is 1-bit HARQ-ACK feedback, the first parameter in a cyclic shift parameter set corresponds to NACK, and the second parameter corresponds to ACK. If the UCI is detected using the first parameter, the UCI is 1-bit NACK, and if the UCI is detected using the second parameter, the UCI is 1-bit ACK.

Optionally, when the SR state of each of the plurality of SR configurations is negative SR, the cyclic shift parameter set corresponding to negative SR among the M+1 cyclic shift parameter sets is determined as the target cyclic shift parameter set for the UCI transmission. When the SR state of one of the plurality of SR configurations is positive SR, the cyclic shift parameter set corresponding to one of the M+1 cyclic shift parameter sets is determined as the target cyclic shift parameter set for the UCI transmission.

The correspondence between the M+1 cyclic shift parameter sets and the negative SR and the M SR configurations is predefined, configured by the network side, or determined according to a preset rule. For example, the $i^{th}$ cyclic shift parameter set in the M+1 cyclic shift parameter sets corresponds to the $i^{th}$ SR configuration, the last cyclic shift parameter set corresponds to negative SR, or vice versa, the first cyclic shift parameter set in the M+1 cyclic shift parameter sets corresponds to negative SR, and the rest of M cyclic shift parameter sets correspond to M SR configurations numbered from small to large at a time, for example, as shown in Table 1 or Table 2:

TABLE 1

| HARQ-ACK/SR state | NACK | ACK |
|---|---|---|
| Negative SR | $CS_{initial}$ | $(CS_{initial} + 6) \bmod 12$ |
| Positive SR, SR Configuration 1 | $(CS_{initial} + 2) \bmod 12$ | $(CS_{initial} + 8) \bmod 12$ |
| Positive SR, SR Configuration 2 | $(CS_{initial} + 4) \bmod 12$ | $(CS_{initial} + 10) \bmod 12$ |

Table 1 is a table showing the correspondence between the cyclic shift parameter set and the SR state when one bit HARQ-ACK is used.

TABLE 2

| HARQ-ACK | NACK, NACK | NACK, ACK | ACK, ACK | ACK, NACK |
|---|---|---|---|---|
| Negative SR | $(CS_{initial} + 0) \bmod 12$ | $(CS_{initial} + 3) \bmod 12$ | $(CS_{initial} + 6) \bmod 12$ | $(CS_{initial} + 9) \bmod 12$ |
| Positive SR, SR Configuration 1 | $(CS_{initial} + 1) \bmod 12$ | $(CS_{initial} + 4) \bmod 12$ | $(CS_{initial} + 7) \bmod 12$ | $(CS_{initial} + 10) \bmod 12$ |
| Positive SR, SR Configuration 2 | $(CS_{initial} + 2) \bmod 12$ | $(CS_{initial} + 5) \bmod 12$ | $(CS_{initial} + 8) \bmod 12$ | $(CS_{initial} + 11) \bmod 12$ |

Table 2 is a table showing the correspondence between the cyclic shift parameter set and the SR state when HARQ-ACK is 2 bits.

In one embodiment, assuming that there is a 1-bit HARQ-ACK transmission at time 1, and HARQ-ACK is configured to be configured with an initial cyclic shift parameter $CS_{initial}=0$ using PUCCH format 0, the cyclic shift parameter set shown in Table 3 can be derived from $CS_{initial}=0$ and Table 1, thereby determining that the cyclic shift parameter set used when SR1 is positive SR is {2,8}.

TABLE 3

| HARQ-ACK/SR state | NACK | ACK |
|---|---|---|
| Negative SR | 0 | 6 |
| Positive SR, SR Configuration 1 | 2 | 8 |
| Positive SR, SR Configuration 2 | 4 | 10 |

The terminal generates 1-bit HARQ-ACK information. If HARQ-ACK is NACK, the terminal transmits HARQ-ACK using the cyclic shift parameter "2" to send the HARQ-ACK. If HARQ-ACK is ACK, the terminal transmits HARQ-ACK using the cyclic shift parameter "8" to send the HARQ-ACK. The presence of positive SR1 transmissions is implicitly expressed by using the set of cyclic shift parameters corresponding to positive SR1.

It should be noted that the 2-bit HARQ-ACK transmission process is similar, except that the mapping table is different, the number of elements in each cyclic shift parameter set is different, and the rest is the same as above, and details are not described again.

It should be noted that in this manner, the correspondence of the M+1 cyclic shift parameter sets with the positive SR states of the negative SR and each of the plurality of SR configurations is predefined or configured by the network device or determined according to preset rules.

Manner 2: determining M+1 PUCCH resources corresponding to the UCI according to a PUCCH resource indication field in Downlink Control Information (DCI).

In an embodiment, the terminal may determine the M+1 PUCCH resources from a preset PUCCH resource set according to the PUCCH resource indication field in the DCI.

Further, a correspondence between the M+1 PUCCH resources and the negative SR state and the positive SR state of each of the plurality of SR configurations is predefined, or determined by the network device and notified to a terminal, or determined according to a preset rule. That is, the correspondence of the M+1 PUCCH resources and the negative SR and the M SR configurations is predefined or configured on the network side or determined according to preset rules. For example, the $i^{th}$ PUCCH resource of the M+1 PUCCH resources corresponds to the $i^{th}$ SR configuration, the last PUCCH resource corresponds to the negative SR, or vice versa, the first PUCCH resource of the M+1 PUCCH resources corresponds to the negative SR, and the remaining M PUCCH resources correspond to M SR configurations with numbers ranging from small to large at a time, for example, as shown in Table 4 or Table 5.

TABLE 4

| HARQ-ACK/SR state | PUCCH resource |
|---|---|
| Negative SR | First resource of M + 1 resources |
| Positive SR, SR Configuration 1 | Second resource of M + 1 resources |
| Positive SR, SR Configuration 2 | Third resource of M + 1 resources |

Table 4 is a correspondence table between a PUCCH resource and an SR state when two SRs are configured.

TABLE 5

| HARQ-ACK/SR state | PUCCH resource |
|---|---|
| Negative SR | First resource of M + 1 resources |
| Positive SR, SR Configuration 1 | Second resource of M + 1 resources |
| Positive SR, SR Configuration 2 | Third resource of M + 1 resources |
| Positive SR, SR Configuration 3 | Fourth resource of M + 1 resources |

Table 5 shows the correspondence between the PUCCH resource and the SR state when three SRs are configured.

Optionally, if the PUCCH resource indication field indicates that the UCI corresponds to the $k^{th}$ PUCCH resource in the PUCCH resource set, the $k^{th}$ PUCCH resource and the $(k+i)^{th}$ PUCCH resource in the PUCCH resource set are determined as M+1 PUCCH resources, or the $k^{th}$ PUCCH resource and the $(k+4+i)^{th}$ PUCCH resource in the PUCCH resource set are determined as M+1 PUCCH resources, where i is an integer greater than 0 and less than or equal to M, and N is the number of PUCCH resources included in the PUCCH resource set. Assuming that the PUCCH resource indication field indicates the $i^{th}$ PUCCH resource in the PUCCH resource set corresponding to the UCI, the $i^{th}$ PUCCH resource in the PUCCH resource set corresponding to the UCI and the $(k+i)^{th}$ PUCCH resource are used as the selected M+1 PUCCH resources, or the $i^{th}$ PUCCH resource in the PUCCH resource set corresponding to the UCI and the $(k+4+i)^{th}$ PUCCH resource are used as the selected M+1 PUCCH resources, where i=1, 2, ..., M and N are numbers of PUCCH resources included in the PUCCH resource set corresponding to the UCI. A mod B represents the remainder obtained by dividing A by B.

It is assumed that the HARQ-ACK transmission still exists at time 1. It is assumed that the high layer signaling configures four PUCCH resource sets for the terminal in advance, and each PUCCH resource set corresponds to a different UCI bit number range. The terminal selects one PUCCH resource set from the four PUCCH resource sets according to the current number of HARQ-ACK bits to be transmitted. Assume that the selected PUCCH resource set contains 4 PUCCH resources, where the correspondence between the 2-bit PUCCH resource indication field and the indicated PUCCH resource is shown in Table 6:

TABLE 6

| PUCCH resource indicator | PUCCH resource |
|---|---|
| '00' | First resource in PUCCH resource set |
| '01' | Second resource in PUCCH resource set |
| '10' | Third resource in PUCCH resource set |
| '11' | Fourth resource in PUCCH resource set |

It is assumed that the indication state of the 2-bit PUCCH resource indication field in the DCI used by the PDCCH corresponding to the downlink transmission for which the HARQ-ACK feedback needs to be performed at time 1 is "10"; according to the correspondence between the PUCCH resource indication field and the indicated PUCCH resource shown in Table 6, it can be determined that the M+1 resources are sequentially the third, the fourth, and the first resources in the PUCCH resource set. Assuming that the correspondence between the M+1 resources and the SR state is shown in Table 3, the third resource in the PUCCH resource set corresponds to negative SR, the fourth resource corresponds to SR1 and the first resource corresponds to SR2.

The terminal generates HARQ-ACK feedback information, determines that the used PUCCH resource is the second resource of the M+1 PUCCH resources, that is, the fourth resource in the PUCCH resource set, according to SR1 being positive, and transmits HARQ-ACK on the determined PUCCH resource according to PUCCH format configured for HARQ-ACK. The PUCCH format may be format1 or 2 or 3 or 4, different PUCCH format's corresponding PUCCH resources are different, and a PUCCH resource may be embodied as a set of PUCCH resource parameters, including some or all of the parameters required for the PUCCH transmission, such as time domain resource size and location, frequency domain resource size and location, cyclic shift (e.g., PUCCH format1), orthogonal spread spectrum OCC sequence (e.g., PUCCH format1 or 4), frequency hopping parameters, etc. It is noted that all definitions of PUCCH resources in the embodiments of the present disclosure are the same herein.

In another embodiment, the PUCCH resource set determined according to the UCI bit number range may further include more than 4 resources, for example including 8 resources, and the correspondence between the PUCCH resource indication field and the indicated PUCCH resource is shown in Table 7:

TABLE 7

| PUCCH resource indicator | PUCCH resource |
|---|---|
| '00' | {1, 5} th resource in PUCCH resource set |
| '01' | {2, 6} th resource in PUCCH resource set |
| '10' | {3, 7} th resource in the PUCCH resource set |
| '11' | {4, 8} th resource in the PUCCH resource set |

In this case, when the 2-bit PUCCH resource indication field indicates that the state is "10", the k=$3^{rd}$ PUCCH resource corresponding to the PUCCH resource indication field in the PUCCH resource set is determined in a manner similar to the foregoing manner (in fact, the PUCCH resource indication field indicates a PUCCH resource subset, and the subset includes two PUCCH resources. Specifically, it indicates which resource can be implicitly determined according to other factors, for example, determined according to the CCE index of the corresponding physical downlink control channel PDCCH. In this embodiment of the present disclosure, only the first resource in the PUCCH resource subset is used as an example for description) corresponding to negative SR, and the $((k+i) \bmod 8)^{th}$ resource corresponds to different SR configurations, that is, the $(3+1) \bmod 8 = 4^{th}$ resource corresponds to positive SR1, that is, the $(3+2) \bmod 8 = 1^{st}$ resource corresponds to positive SR2.

In another embodiment, in the case that the PUCCH resource indication field indicates one PUCCH resource subset in the PUCCH resource set, where the PUCCH resource subset includes more than one PUCCH resource.

In the case that a quantity of the PUCCH resources in the PUCCH resource subset is less than M+1, the M+1 PUCCH resources is determined from a plurality of PUCCH resource subsets in the PUCCH resource set in an order from the one PUCCH resource subset to the PUCCH resource subsets following the one PUCCH resource subset. That is, one PUCCH resource subset in the PUCCH resource set corresponding to the first UCI corresponds to the PUCCH resource indication field, and the PUCCH resource set includes more than one PUCCH, the PUCCH resources in the PUCCH resource subset corresponding to the PUCCH resource indication field and the PUCCH resources in a subsequent PUCCH resource subset are sequentially selected as the selected M+1 PUCCH resources. It is assumed that the PUCCH resource set determined according to the UCI bit number range may further include more than 4 resources, for example, includes 8 resources, as shown in Table 7, when the indication state of the 2-bit PUCCH resource indication field is "10", it is determined that one PUCCH resource subset is indicated by the PUCCH resource indication field in the PUCCH resource set, and M+1 PUCCH resources may be determined as two PUCCH resources in the third PUCCH resource subset corresponding to the PUCCH resource indication field, and one PUCCH resource in the next PUCCH resource subset (for example, approximately the first PUCCH resource), that is, the third PUCCH resource in the PUCCH resource set corresponds to negative SR, the seventh PUCCH resource corresponds to positive SR1, and the fourth PUCCH resource corresponds to positive SR2.

If the number of PUCCH resources included in the PUCCH resource subset is equal to M+1, the PUCCH resources in the PUCCH resource subset are used as M+1 PUCCH resources. That is, when one PUCCH resource subset corresponding to the PUCCH resource indication field in the PUCCH resource set corresponding to the UCI includes M+1 PUCCH resources, the one PUCCH resource subset corresponding to the PUCCH resource indication field is used as the selected M+1 PUCCH resources.

If the number of PUCCH resources included in the PUCCH resource subset is greater than M+1, M+1 PUCCH resources are determined from the PUCCH resource subset. That is, when one PUCCH resource subset corresponding to the PUCCH resource indication field in the PUCCH resource set corresponding to the UCI includes more than M+1 PUCCH resources, the M+1 PUCCH resources (for example, the first M+1 or the last M+1 resources in the subset) are selected from the one PUCCH resource subset corresponding to the PUCCH resource indication field as the selected M+1 PUCCH resources.

Mode 3: M+1 PUCCH resources are determined from the preconfigured J PUCCH resources as the M+1 PUCCH resources, where J is an integer greater than or equal to M+1.

The J PUCCH resources are configured by high layer signaling, or the J PUCCH resources are determined from a plurality of PUCCH resource sets preconfigured by a high layer signaling according to a bit quantity of the UCI. Specifically, the J PUCCH resources preconfigured are configured by high layer signaling, or the J PUCCH resources are selected from a plurality of PUCCH resource sets preconfigured by a high layer signaling according to a bit quantity of the UCI, and the resources in the PUCCH resource set are used as the J PUCCH resources. The manner in which the M+1 PUCCH resources are determined from the preconfigured J PUCCH resources as the M+1 PUCCH resources may include, but is not limited to, a manner in which the first M+1 or the last M+1 of the J PUCCH resources are selected. Wherein the correspondence between the M+1 PUCCH resources and the negative SR and the M SR configurations is predefined or configured on the network side or determined according to preset rules. For example, the $i^{th}$ PUCCH resource of the M+1 PUCCH resources corresponds to the $i^{th}$ SR configuration, and the last PUCCH resource corresponds to the negative SR, or vice versa, the first PUCCH resource of the M+1 PUCCH resources corresponds to the negative SR, and the remaining M PUCCH resources correspond to M SR configurations with numbers ranging from small to large at a time. It is assumed that CSI transmission still exists at time 1, and the configuration supports simultaneous transmission of the CSI and the HARQ-ACK/SR. Assuming that four PUCCH resources corresponding to the CSI are configured for the terminal in advance, it can be determined that the M+1 resources are sequentially first, second, and third resources in the four PUCCH resources corresponding to the CSI. The first resource (that is, the first resource in the M+1 resources) in the four PUCCH resources corresponding to the CSI corresponds to the negative SR, the second resource (that is, the second resource in the M+1 resources) in the four PUCCH resources corresponding to the CSI corresponds to the positive SR1, and the third resource (that is, the third resource in the M+1 resources) in the four PUCCH resources corresponding to the CSI corresponds to the positive SR2.

It is noted that, in Mode 2 and Mode 3, M is an integer greater than 1, one PUCCH resource of the M+1 PUCCH resources is for the UCI transmission when the SR state of the plurality of SR configurations is negative SR, and each PUCCH resource of the remaining PUCCH resources of the M+1 PUCCH resources is for the UCI transmission when the SR state of the one SR configuration corresponding to the PUCCH resource in the plurality of SR configurations is positive SR.

Further, how the terminal determines the target PUCCH resource for the UCI transmission according to the SR states of the plurality of SR configurations may be implemented by, but is not limited to:

Corresponding to mode 1 and step 12, one cyclic shift parameter corresponding to the feedback state of the UCI in the target cyclic shift parameter set is selected according to the feedback state of the UCI. Through this one cyclic shift parameter, the UCI is transmitted. Specifically, when negative SR is used (i.e., there is no positive SR in the M SR configurations, i.e., no SR needs to be transmitted), the UCI is transmitted using the cyclic shift parameter set corresponding to negative SR in the M+1 cyclic shift parameter sets, i.e., the cyclic shift parameter set corresponding to the UCI is transmitted using only the UCI. On the other hand, when the $i^{th}$ SR in the M SR configurations is positive SR, the UCI is transmitted using the cyclic shift parameter set corresponding to the $i^{th}$ SR. Each of the M+1 cyclic shift parameter sets other than the cyclic shift parameter set corresponding to negative SR corresponds to one of the M SR configurations, respectively.

Corresponding to the second and third modes, step 12 may include: in the case that the SR state of each of the plurality of SR configurations is negative SR, determining the PUCCH resource corresponding to negative SR in the M+1 PUCCH resources as the target PUCCH resource for the UCI transmission. That is, when the SR state is negative SR, UCI is transmitted using PUCCH resources corresponding to negative SR among M+1 PUCCH resources, that is, UCI is transmitted using PUCCH resources corresponding to UCI. On the other hand, when the SR state of one of the plurality of SR configurations is positive SR, the PUCCH resource corresponding to one of the M+1 PUCCH resources is determined as the target PUCCH resource for the UCI transmission. That is, when the $i^{th}$ SR in the M SR configurations is positive SR, the UCI is transmitted using the PUCCH resource corresponding to the $i^{th}$ SR; Each of the M PUCCH resources except the PUCCH resource corresponding to the negative SR among the M+1 PUCCH resources corresponds to one of the M SR configurations.

Optionally, the UCI includes at least one of a hybrid automatic repeat request acknowledgement HARQ-ACK and Channel State Information (CSI). The CRC corresponding to the CSI part1 is scrambled when the UCI includes the CSI, and the CSI consists of the first part CSI (CSI part1) and the second part CSI (CSI part2). Where the CSI includes one or more of periodic CSI, aperiodic CSI, and semi-persistent scheduling CSI.

Taking CSI as an example, the terminal generates CSI feedback information, determines that the used PUCCH resource is the second resource of the M+1 PUCCH resources according to SR1 being positive, that is, the second resource of the four PUCCH resources corresponding to CSI, and transmits CSI on the determined PUCCH resource according to PUCCH format configured for CSI; PUCCH format may be format 2 or 3 or 4.

Corresponding to the foregoing manner 3, taking CSI as an example, the M+1 resources may also be three resources of the four PUCCH resources corresponding to the CSI that meet the start of the first resource capable of carrying the CSI transmission according to the configured code rate. For example, assuming that the first resource cannot carry the CSI according to the configured code rate and the second resource is possible, it is determined that the M+1 resources are sequentially the second, third, and fourth resources of the four PUCCH resources corresponding to the CSI. The second resource (that is, the first resource of the M+1 resources) in the four PUCCH resources corresponding to the CSI corresponds to negative SR, the third resource (that is, the second resource of the M+1 resources) in the four PUCCH resources corresponding to the CSI corresponds to positive SR1, and the fourth resource (that is, the third resource of the M+1 resources) in the four PUCCH resources corresponding to the CSI corresponds to positive SR2.

It should be noted that in the above-described embodiment, only the CSI is used as an example. The UCI may also have the HARQ-ACK (for example, 1 or 2 bits) while the CSI is present, and the CSI and the HARQ-ACK are configured for simultaneous transmission. Therefore, the above-described process is replaced by transmitting the HARQ-ACK and the CSI on the corresponding PUCCH resource, and details are not described again.

In another embodiment, step 11 may be preceded by further performing the step of determining M+1 Physical Uplink Control Channel (PUCCH) resources corresponding to the Uplink Control Information (UCI) when one of the following conditions is satisfied: Alternatively, the current time is the transmission occasion of the SR, and there are a plurality of SR configurations in the transmission occasion. That is, in the SR transmission occasion, the above operation is performed regardless of whether at least two SR configurations are included in the SR transmission occasion. The terminal may perform SR transmission in any one of the transmission opportunities of the SR1 and the SR2 overlapping with the other UCI in the manner described above, that is, if only one SR configuration exists in one SR transmission occasion and overlaps with the other UCI, the terminal may also perform the above process. In this case, the transmission mechanism of the UCI is the same as in any one of the SR transmission opportunities. This approach enables a unified transmission scheme for any SR transmission occasion.

Alternatively, the above operation is performed in an SR transmission occasion including at least two SR configurations, i.e., only in an SR transmission occasion including at least two SR configurations. The terminal performs the above process when there are multiple SR configuration overlapping transmission opportunities and there are other UCIs in the transmission opportunities. If only one SR configuration is present in one SR transmission occasion and other UCIs are present in the transmission occasion, transmission may also be performed in a manner other than as described above, using other conventions; Implicitly expressing positive SR by transmitting other UCIs on SR resources corresponding to positive SR, or concatenating only 1-bit SR with other UCIs on resources corresponding to other UCIs, etc.; For example, for a transmission occasion of only SR1 at time 2, only one positive SR1 may be present at time 2, and the positive SR1 may be implicitly expressed by transmitting other UCIs on SR resources corresponding to the SR1, or whether positive SR1 or not, the one-bit SR may be cascaded together with the other UCIs at time 2 for simultaneous transmission on resources corresponding to the other UCIs, because only one SR configuration is present at time 2, and the network device may always judge that the one-bit SR corresponds to the SR1; For another example, if the transmission occasion is only SR2 at time 3, only one positive SR2 may exist at time 3, and the positive SR2 may be implicitly expressed by transmitting other UCIs on SR resources corresponding to the SR2, or whether or not the positive SR2 is concatenated with the other UCIs at time 3, and simultaneously transmitted on resources corresponding to the other UCIs using a 1-bit SR, because only one SR configuration exists at time 3, and the network device can always judge that the 1-bit SR corresponds to the SR2. In this case, the above operation is performed only in the transmission occasion including the plurality of SRs, which reduces the overhead of occupying the transmission resources of the other UCI. However, in different SR transmission opportunities, the transmission schemes used may be different. When only one SR is used, M+1 resources need not be determined, and the other UCI may determine that only one resource is used for transmission. However, since the network device and the terminal know in advance the specific configuration information of the plurality of SR configurations, for example, a period, it is possible to know in advance the overlap of the SR configurations in each SR transmission occasion, so as to determine to select a corresponding transmission scheme for transmission, and there is no ambiguity between the network device and the terminal in understanding the transmission scheme.

According to the information transmission method in the embodiment of the present disclosure, when a terminal has a plurality of SR configurations, if a UCI exists in an SR transmission occasion, M+1 PUCCH resources are determined, and a transmission UCI is selected from the M+1 PUCCH resources according to the selected SR, and an SR state of the plurality of SR configurations is implicitly indicated by the PUCCH resources for the UCI transmission, thereby ensuring correct uplink scheduling of the terminal by the network device.

The above embodiment describes the information transmission method on the terminal side of the present disclosure, and the corresponding terminal of the present embodiment will be further described with reference to the accompanying drawings.

Figure 2:
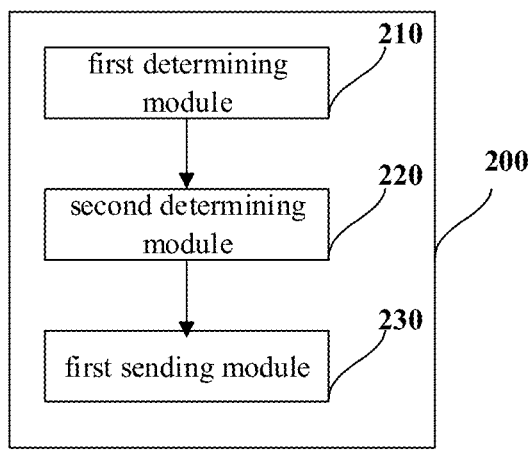
FIG. 2 is a schematic view of a module structure of a terminal in an embodiment of the present disclosure.

Specifically, as shown in FIG. 2, the terminal 200 in an embodiment of the present disclosure includes:
 a first determining module 210, configured to determine a plurality of Physical Uplink Control Channel (PUCCH) resources corresponding to Uplink Control Information (UCI);
 a second determining module 220, configured to determine a target PUCCH resource for the UCI transmission from the plurality of PUCCH resources, according to Scheduling Request (SR) states of a plurality of SR configurations; and
 a first sending module 230, configured to send the UCI through the target PUCCH resource.

Optionally, the first determining module 210 includes:
 a first determining sub-module, configured to determine the plurality of PUCCH resources corresponding to the UCI based on an initial cyclic shift parameter configured for the UCI.

Optionally, the first determining sub-module includes:
 a first determining unit, configured to determine M+1 cyclic shift parameter sets based on the initial cyclic shift parameter configured for the UCI; where each cyclic shift parameter set includes a plurality of cyclic shift parameters, and each cyclic shift parameter in each cyclic shift parameter set corresponds to a feedback state of the UCI; each cyclic shift parameter in the cyclic shift parameter sets is determined by performing a preset offset based on the initial cyclic shift parameter; where M is an integer greater than 1, one cyclic shift parameter set of the M+1 cyclic shift parameter sets is for the UCI transmission in the case that the SR states of the plurality of SR configurations are negative SR, and each cyclic shift parameter set of the rest of the M+1 cyclic shift parameter sets is for the UCI transmission in the case that the SR state of the SR configuration corresponding to the each cyclic shift parameter set is positive SR.

Optionally, the first determining unit includes:
 a first determining sub-unit, configured to, in the case that the SR state of each of the plurality of SR configurations is negative SR, determine the cyclic shift parameter set corresponding to negative SR among the M+1 cyclic shift parameter sets as a target cyclic shift parameter set for the UCI transmission;
 a second determining sub-unit, configured to, in the case that the SR state of one SR configuration of the plurality of SR configurations is positive SR, determine the cyclic shift parameter set corresponding to the one SR configuration among the M+1 cyclic shift parameter sets as a target cyclic shift parameter set for the UCI transmission.

Optionally, the first determining module 210 further includes:

a second determining sub-module, configured to determine M+1 PUCCH resources corresponding to the UCI according to a PUCCH resource indication field in Downlink Control Information (DCI); or a third determining sub-module, configured to determine M+1 PUCCH resources from preconfigured J PUCCH resources as the M+1 PUCCH resources, where J is an integer greater than or equal to M+1;

where M is an integer greater than 1, one PUCCH resource of the M+1 PUCCH resources is for the UCI transmission in the case that the SR states of the plurality of SR configurations are negative SR, and each PUCCH resource of the rest of the M+1 PUCCH resources is for the UCI transmission in the case that the SR state of the SR configuration corresponding to the each PUCCH resource is positive SR.

Optionally, the second determining sub-module includes:

a third determining unit, configured to determine the M+1 PUCCH resources from a preset PUCCH resource set according to the PUCCH resource indication field in the DCI.

Optionally, the second determining sub-module further includes:

a fourth determining unit, configured to, in the case that the PUCCH resource indication field indicates that the UCI corresponds to a kth PUCCH resource in the PUCCH resource set, determine the kth PUCCH resource and a $((k+i) \bmod N)^{th}$ PUCCH resource in the PUCCH resource set as the M+1 PUCCH resources, or determine the kth PUCCH resource and a $((k+4+i) \bmod N)_{th}$ PUCCH resource in the PUCCH resource set as the M+1 PUCCH resources;

where i is an integer greater than 0 and less than or equal to M, and N is a quantity of PUCCH resources in the PUCCH resource set.

Optionally, the second determining sub-module further includes:

in the case that the PUCCH resource indication field indicates one PUCCH resource subset in the PUCCH resource set, where the PUCCH resource subset includes more than one PUCCH resource;

a fifth determining unit, configured to, in the case that a quantity of the PUCCH resources in the PUCCH resource subset is less than M+1, determine the M+1 PUCCH resources from the one PUCCH resource subset and the subsequent one or more PUCCH resource subsets, in an order from the PUCCH resources in the one PUCCH resource subset to the PUCCH resources in the subsequent one or more PUCCH resource subsets;

a sixth determining unit, configured to in the case that the quantity of the PUCCH resources in the PUCCH resource subset is equal to M+1, determine the PUCCH resources in the PUCCH resource subset as the M+1 PUCCH resources;

a seventh determining unit, configured to in the case that the quantity of the PUCCH resources in the PUCCH resource subset is greater than M+1, determine the M+1 PUCCH resources from the PUCCH resource subset.

Optionally, the J PUCCH resources are configured by a high layer signaling, or the J PUCCH resources are determined from a plurality of PUCCH resource sets preconfigured by a high layer signaling according to a bit quantity of the UCI.

Optionally, a correspondence between the M+1 cyclic shift parameter sets and the negative SR state and the positive SR state of each of the plurality of SR configurations is predefined, or configured by a network device, or determined according to a preset rule.

Optionally, a correspondence between the M+1 PUCCH resources and the negative SR state and the positive SR state of each of the plurality of SR configurations is predefined, or configured by a network device, or determined according to a preset rule.

Optionally, the second determining module 220 includes:

a fourth determining sub-module, configured to, in the case that the SR state of each of the plurality of SR configurations is negative SR, determine the PUCCH resource corresponding to negative SR in the M+1 PUCCH resources as the target PUCCH resource for the UCI transmission;

a fifth determining sub-module, configured to in the case that the SR state of one SR configuration of the plurality of SR configurations is positive SR, determine the PUCCH resource corresponding to the one SR configuration in the M+1 PUCCH resources as the target PUCCH resource for the UCI transmission.

Optionally, the M is determined according to one of:

a maximum quantity of SR configurations supported by the terminal;

a quantity of SR configurations configured for the terminal;

a quantity of SR configurations overlapped in a same SR transmission occasion configured for the terminal; and a quantity indicated through a configuration signaling sent by a network device.

Optionally, the UCI includes at least one of:

a Hybrid Automatic Repeat reQuest-ACKnowledgement (HARQ-ACK) and Channel State Information (CSI).

Optionally, the terminal further includes:

a third determining module, configured to determine the M+1 PUCCH resources corresponding to the UCI, in the case that:

a current time is a transmission occasion of SR; or a current time is a transmission occasion of SR, and there exist a plurality of SR configurations in the transmission occasion.

The terminal embodiment of the present disclosure corresponds to the embodiment of the information transmission method on the terminal side. All the implementation means in the above method embodiment are applicable to the embodiment of the terminal, and the same technical effect can also be achieved. When the terminal has a plurality of SR configurations, if there is a UCI in the transmission occasion of the SR, it determines M+1 PUCCH resources, selects one of the M+1 PUCCH resources according to the selected SR, and implicitly indicates the SR state of the plurality of SR configurations by the PUCCH resources for the UCI transmission, thereby ensuring correct uplink scheduling of the terminal by the network device.

Figure 3:
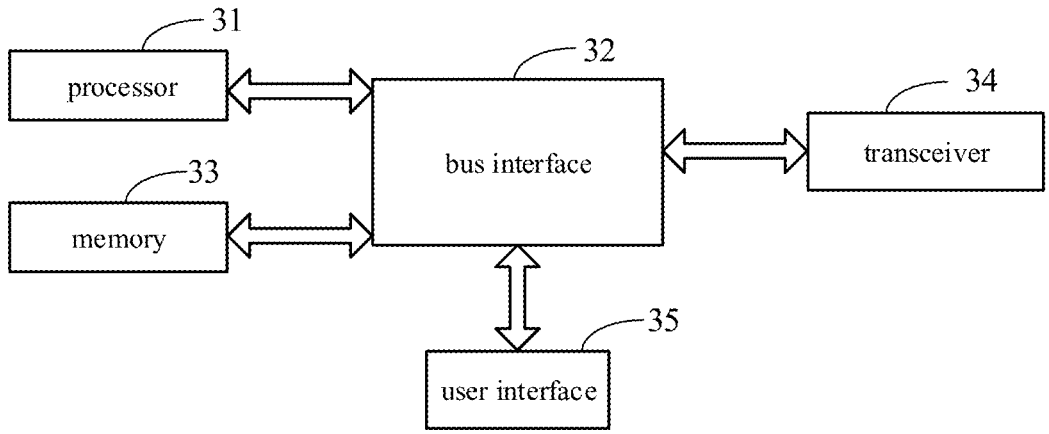
FIG. 3 is a schematic view of a terminal in an embodiment of the present disclosure.

As shown in FIG. 3, a terminal is provide in an embodiment of the present embodiment, including:

a processor 31, a memory 33 connected to the processor 31 through a bus interface 32, the memory 33 for storing programs and data used by the processor 31 in performing operations, and the processor 31 invokes and executes the programs and data stored in the memory 33, to perform a process of determining a plurality of Physical Uplink Control Channel (PUCCH) resources corresponding to the Uplink Control Information (UCI);

determining a target PUCCH resource for the UCI transmission from the plurality of PUCCH resources, according to Scheduling Request (SR) states of a plurality of SR configurations.

The transceiver 34 is connected to the bus interface 32 for receiving and transmitting data under the control of the processor 31, and specifically for the UCI transmission through the target PUCCH resource.

The processor 31 executes the computer program to:

determine the plurality of PUCCH resources corresponding to the UCI based on an initial cyclic shift parameter configured for the UCI.

Optionally, the processor 31 executes the computer program to:

determine M+1 cyclic shift parameter sets based on the initial cyclic shift parameter configured for the UCI; where each cyclic shift parameter set includes a plurality of cyclic shift parameters, and each cyclic shift parameter in each cyclic shift parameter set corresponds to a feedback state of the UCI; each cyclic shift parameter in the cyclic shift parameter sets is determined by performing a preset offset based on the initial cyclic shift parameter; where M is an integer greater than 1, one cyclic shift parameter set of the M+1 cyclic shift parameter sets is for the UCI transmission in the case that the SR states of the plurality of SR configurations are negative SR, and each cyclic shift parameter set of the rest of the M+1 cyclic shift parameter sets is for the UCI transmission in the case that the SR state of the SR configuration corresponding to the each cyclic shift parameter set is positive SR.

Optionally, the processor 31 executes the computer program to:

in the case that the SR state of each of the plurality of SR configurations is negative SR, determine the cyclic shift parameter set corresponding to negative SR among the M+1 cyclic shift parameter sets as a target cyclic shift parameter set for the UCI transmission;

in the case that the SR state of one SR configuration of the plurality of SR configurations is positive SR, determine the cyclic shift parameter set corresponding to the one SR configuration among the M+1 cyclic shift parameter sets as a target cyclic shift parameter set for the UCI transmission.

Optionally, the processor 31 executes the computer program to:

determine M+1 PUCCH resources corresponding to the UCI according to a PUCCH resource indication field in Downlink Control Information (DCI); or determine M+1 PUCCH resources from preconfigured J PUCCH resources as the M+1 PUCCH resources, where J is an integer greater than or equal to M+1;

where M is an integer greater than 1, one PUCCH resource of the M+1 PUCCH resources is for the UCI transmission in the case that the SR states of the plurality of SR configurations are negative SR, and each PUCCH resource of the rest of the M+1 PUCCH resources is for the UCI transmission in the case that the SR state of the SR configuration corresponding to the each PUCCH resource is positive SR.

Optionally, the processor 31 executes the computer program to:

determine the M+1 PUCCH resources from a preset PUCCH resource set according to the PUCCH resource indication field in the DCI.

Optionally, the processor 31 executes the computer program to:

in the case that the PUCCH resource indication field indicates that the UCI corresponds to a kth PUCCH resource in the PUCCH resource set, determine the kth PUCCH resource and a ((k+i) mod N)th PUCCH resource in the PUCCH resource set as the M+1 PUCCH resources, or determine the kth PUCCH resource and a ((k+4+i) mod N)th PUCCH resource in the PUCCH resource set as the M+1 PUCCH resources;

where i is an integer greater than 0 and less than or equal to M, and N is a quantity of PUCCH resources in the PUCCH resource set.

Optionally, the processor 31 executes the computer program to:

in the case that the PUCCH resource indication field indicates one PUCCH resource subset in the PUCCH resource set, where the PUCCH resource subset includes more than one PUCCH resource;

in the case that a quantity of the PUCCH resources in the PUCCH resource subset is less than M+1, determine the M+1 PUCCH resources from the one PUCCH resource subset and the subsequent one or more PUCCH resource subsets, in an order from the PUCCH resources in the one PUCCH resource subset to the PUCCH resources in the subsequent one or more PUCCH resource subsets;

in the case that the quantity of the PUCCH resources in the PUCCH resource subset is equal to M+1, determine the PUCCH resources in the PUCCH resource subset as the M+1 PUCCH resources;

in the case that the quantity of the PUCCH resources in the PUCCH resource subset is greater than M+1, determine the M+1 PUCCH resources from the PUCCH resource subset.

Optionally, the J PUCCH resources are configured by a high layer signaling, or the J PUCCH resources are determined from a plurality of PUCCH resource sets preconfigured by a high layer signaling according to a bit quantity of the UCI.

Optionally, a correspondence between the M+1 cyclic shift parameter sets and the negative SR state and the positive SR state of each of the plurality of SR configurations is predefined, or configured by a network device, or determined according to a preset rule.

Optionally, a correspondence between the M+1 PUCCH resources and the negative SR state and the positive SR state of each of the plurality of SR configurations is predefined, or configured by a network device, or determined according to a preset rule.

Optionally, the processor 31 executes the computer program to:

in the case that the SR state of each of the plurality of SR configurations is negative SR, determine the PUCCH resource corresponding to negative SR in the M+1 PUCCH resources as the target PUCCH resource for the UCI transmission;

in the case that the SR state of one SR configuration of the plurality of SR configurations is positive SR, determine the PUCCH resource corresponding to the one SR configuration in the M+1 PUCCH resources as the target PUCCH resource for the UCI transmission.

Optionally, the M is determined according to one of:

a maximum quantity of SR configurations supported by the terminal;

a quantity of SR configurations configured for the terminal;

a quantity of SR configurations overlapped in a same SR transmission occasion configured for the terminal; and a quantity indicated through a configuration signaling sent by a network device.

Optionally, the UCI includes at least one of:

a Hybrid Automatic Repeat reQuest-ACKnowledgement (HARQ-ACK) and Channel State Information (CSI).

Optionally, the processor 31 executes the computer program to:

determine the M+1 PUCCH resources corresponding to the UCI, in the case that:

a current time is a transmission occasion of SR; or a current time is a transmission occasion of SR, and there exist a plurality of SR configurations in the transmission occasion.

It should be noted that in FIG. 3, the bus architecture may include any number of interconnected buses and bridges, in particular one or more processors represented by the processor 31 and various circuits of the memory represented by the memory 33 linked together. The bus architecture may also link various other circuits, such as peripherals, voltage regulators, and power management circuits, all of which are well known in the art and therefore will not be described further herein. The bus interface provides an interface. The transceiver 34 may be a plurality of elements, including a transmitter and a transceiver, providing units for communicating with various other devices on a transmission medium. For different terminals, the user interface 35 may also be an interface capable of externally interfacing a desired device, including, but not limited to, a keypad, a display, a speaker, a microphone, a joystick, and the like. The processor 31 is responsible for managing the bus architecture and general processing, and the memory 33 may store data used by the processor 31 in performing operations.

The information transmission method of the embodiment of the present disclosure is described above from the terminal side, and the information transmission method on the network device side will be further described below with reference to the accompanying drawings.

Figure 4:
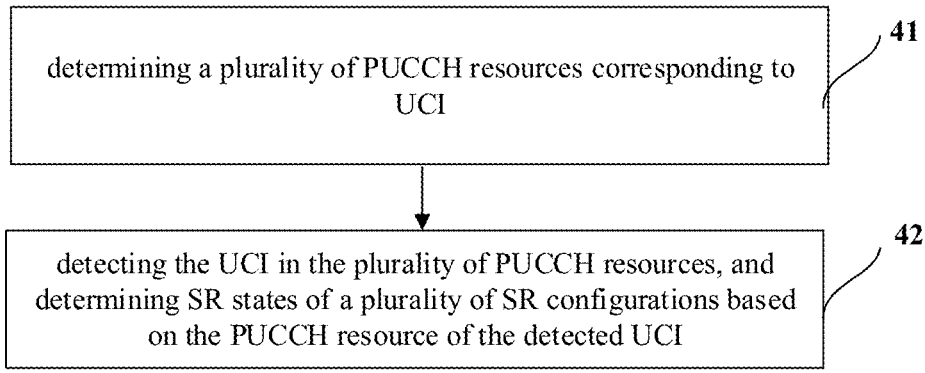
FIG. 4 is a flow chart of an information transmission method at a network device side in an embodiment of the present disclosure.

As shown in FIG. 4, an embodiment of the present disclosure provides an information transmission method, including the steps of:

Step 41: determining a plurality of Physical Uplink Control Channel (PUCCH) resources corresponding to Uplink Control Information (UCI).

The plurality of PUCCH resources are optionally M+1 PUCCH resources, wherein M is an integer greater than 1, one PUCCH resource of the M+1 PUCCH resources is for the UCI transmission when the SR state of the plurality of SR configurations is negative SR, and each PUCCH resource of the remaining PUCCH resources of the M+1 PUCCH resources is for the UCI transmission when the SR state of the one SR configuration corresponding to the PUCCH resource of the plurality of SR configurations is positive SR. That is, one PUCCH of the M+1 PUCCH resources corresponds to negative SR, and the remaining M PUCCH resources correspond to a state in which each SR in the SR configuration is configured as positive SR.

Optionally, M determines according to one of the following: The number of maximum SR configurations supported by the terminal. The number of SR configurations configured by the terminal. The number of overlapping SR configurations of the terminal configuration in the same SR transmission occasion; the number of configuration signaling indicated by the network device. That is, M is the maximum number of multiple SR configurations supported in the system and configured for the same terminal; or M is the number of multiple SR configurations configured for the same terminal; or M is a number of SR configurations in which transmission opportunities overlap among a plurality of SR configurations configured for the same terminal; alternatively, M is notified to the terminal by the network side through configuration signaling.

Step 42: detecting the UCI in the plurality of PUCCH resources, and determining Scheduling Request (SR) states of a plurality of SR configurations based on the PUCCH resource of the detected UCI.

Since one of the plurality of PUCCH resources corresponds to negative SR, the remaining PUCCH resources correspond to a state in which each SR in the SR configuration is configured as positive SR, respectively. If the network device detects the UCI on a PUCCH, it can determine the SR state configured by the SR according to the PUCCH, thereby ensuring correct uplink scheduling of the terminal.

Here, similar to the terminal-side embodiment described above, step 41 may be implemented in a manner not limited to:

Mode 4: D determining the plurality of PUCCH resources corresponding to the UCI based on an initial cyclic shift parameter configured for the UCI.

Optionally, determining M+1 PUCCH resources corresponding to the UCI based on the initial cyclic shift parameters configured for the UCI includes determining M+1 sets of cyclic shift parameters based on the initial cyclic shift parameters configured for the UCI. Each cyclic shift parameter set includes a plurality of cyclic shift parameters, and each cyclic shift parameter in each cyclic shift parameter set corresponds to a feedback state of one UCI. Each cyclic shift parameter in the set of cyclic shift parameters is determined by performing a preset offset based on the initial cyclic shift parameter, one cyclic shift parameter corresponds to a PUCCH resource, M is an integer greater than 1, one cyclic shift parameter set in the set of M+1 cyclic shift parameters is for the UCI transmission when an SR state of a plurality of scheduling requests SR configurations is negative SR, and each of the remaining cyclic shift parameter sets in the set of cyclic shift parameters is for the UCI transmission when an SR state of one SR configuration corresponding to the set of cyclic shift parameters in the plurality of SR configurations is positive SR, respectively. That is, each cyclic shift parameter corresponds to one PUCCH resource, and each set of cyclic shift parameters is obtained by a preset offset based on an initial cyclic shift parameter, wherein the cyclic shift parameters in the set of cyclic shift parameters correspond to cyclic shifts in the same RB.

In this manner, step 42 may be implemented with reference to detecting UCI using each of the M+1 cyclic shift parameter sets. When the UCI is detected using the cyclic shift parameters in the cyclic shift parameter set corresponding to the negative SR, it is determined that the SR state of each of the plurality of SR configurations is negative SR. When the UCI is detected using the cyclic shift parameter in the cyclic shift parameter set corresponding to one of the plurality of SR configurations, it is determined that the SR state of one of the plurality of SR configurations is positive SR. That is, when the UCI is received using the cyclic shift parameter set corresponding to negative SR, it is determined that the state of the SR is negative, that is, none of the M SR configurations is transmitted by the positive SR; When receiving the UCI using the cyclic shift parameter set corresponding to the $i^{th}$ SR configuration, it is determined that the state of the SR is that the $i^{th}$ SR configuration is positive SR, that is, the $i^{th}$ SR configuration in the $i^{th}$ SR configuration transmits positive SR, and uplink scheduling is performed according to a requirement corresponding to the $i^{th}$ SR configuration. According to the first embodiment, the PUCCH is detected according to a plurality of cyclic shift parameter sets corresponding to the above-mentioned Table 3, and finally the PUCCH is detected when the cyclic shift parameter "2" or "8" is used, to detect the HARQ-ACK information, it is further determined whether to retransmit the corresponding downlink.

In this embodiment, the correspondence of the M+1 cyclic shift parameter sets with the positive SR states of the negative SR and each of the plurality of SR configurations is predefined or configured by the network device or determined according to preset rules.

Method 5: determining M+1 PUCCH resources corresponding to the UCI according to a PUCCH resource indication field in Downlink Control Information (DCI).

In the embodiment of the present disclosure, the network device may determine M+1 PUCCH resources from a preset PUCCH resource set according to the PUCCH resource indication field in the DCI. Further, the correspondence of the M+1 PUCCH resources with the positive SR states of the negative SR and each of the plurality of SR configurations is predefined or configured by the network device or determined according to preset rules. Specifically, reference may be made to the above Table 4 and Table 5, and therefore details are not described herein.

Optionally, if the PUCCH resource indication field indicates that the UCI corresponds to the $k^{th}$ PUCCH resource in the PUCCH resource set, the $k^{th}$ PUCCH resource and the $(k+i)^{th}$ PUCCH resource in the PUCCH resource set are determined as M+1 PUCCH resources, or the $k^{th}$ PUCCH resource and the $(k+4+i)^{th}$ PUCCH resource in the PUCCH resource set are determined as M+1 PUCCH resources. i is an integer greater than 0 and less than or equal to M, and N is the number of PUCCH resources included in the PUCCH resource set. According to the second mode, the PUCCH is detected on the determined M+1 PUCCH resources. If the PUCCH is detected only on the second resource in the M+1 PUCCH resources, that is, the fourth resource in the PUCCH resource set, it is implicitly determined that the terminal transmits the positive SR1 according to the detected PUCCH resources, and corresponding uplink scheduling is performed on the terminal according to the service requirements corresponding to the SR1. The HARQ-ACK is further received and a determination is made as to whether to retransmit the corresponding downlink according to the HARQ-ACK.

In another alternative embodiment, when the PUCCH resource indication field indicates a PUCCH resource subset in the PUCCH resource set, wherein the PUCCH resource subset contains more than one PUCCH resource. If the number of PUCCH resources included in the PUCCH resource subset is less than M+1, determining M+1 PUCCH resources from a plurality of PUCCH resource subsets in the PUCCH resource set starting from the PUCCH resource subset. That is, when a PUCCH resource subset corresponding to the PUCCH resource indication field in the PUCCH resource set corresponding to the first UCI includes more than one PUCCH resource, PUCCH resources in the PUCCH resource subset corresponding to the PUCCH resource indication field and PUCCH resources in a subsequent PUCCH resource subset are sequentially selected as the selected M+1 PUCCH resources.

If the number of PUCCH resources included in the PUCCH resource subset is equal to M+1, the PUCCH resources in the PUCCH resource subset are used as M+1 PUCCH resources. That is, when a PUCCH resource subset corresponding to the PUCCH resource indication field in the PUCCH resource set corresponding to the UCI includes M+1 PUCCH resources, a PUCCH resource subset corresponding to the PUCCH resource indication field is used as the selected M+1 PUCCH resources.

If the number of PUCCH resources included in the PUCCH resource subset is greater than M+1, M+1 PUCCH resources are determined from the PUCCH resource subset. That is, when the PUCCH resource set corresponding to the UCI is a PUCCH resource subset corresponding to the PUCCH resource indication field, and the PUCCH resource subset includes more than M+1 PUCCH resources, the M+1 PUCCH resources (for example, the first M+1 resources or the last M+1 resources in the subset) are selected from the one PUCCH resource subset corresponding to the PUCCH resource indication field as the selected M+1 PUCCH resources.

Mode 6: determining M+1 PUCCH resources from preconfigured J PUCCH resources as the M+1 PUCCH resources, where J is an integer greater than or equal to M+1.

The J PUCCH resources are configured by high layer signaling, or the J PUCCH resources are determined from a plurality of PUCCH resource sets preconfigured by a high layer signaling according to a bit quantity of the UCI. Specifically, the manner in which the M+1 PUCCH resources are determined from the preconfigured J PUCCH resources as the M+1 PUCCH resources may include, but is not limited to, a manner in which the first M+1 or the last M+1 of the J PUCCH resources are selected.

M is an integer greater than 1 in Mode 5 and Mode 6, one PUCCH resource of the M+1 PUCCH resources is for the UCI transmission when the SR state of the plurality of SR configurations is negative SR, and each PUCCH resource of the remaining PUCCH resources of the M+1 PUCCH resources is for the UCI transmission when the SR state of the one SR configuration corresponding to the PUCCH resource in the plurality of SR configurations is positive SR.

Further, the preconfigured J PUCCH resources are configured for high layer signaling, or the J PUCCH resources are selected from a plurality of PUCCH resource sets preconfigured by a high layer signaling according to a bit quantity of the UCI, and the resources in the PUCCH resource set are used as the J PUCCH resources. According to formula 3, the network device detects the PUCCH on the determined M+1 PUCCH resources. If the PUCCH is detected only on the second resource of the M+1 PUCCH resources, that is, on the second resource of the four PUCCH resources corresponding to the CSI, it is implicitly determined that the terminal transmits the positive SR1 according to the detected resource of the PUCCH. According to the service requirement corresponding to the SR1, the terminal performs corresponding uplink scheduling, and further receives the CSI.

In mode five and mode six, step 42 may be implemented with reference to a manner not limited to determining that the SR state of each of the plurality of SR configurations is negative SR when UCI is detected on the PUCCH resources corresponding to negative SR among the M+1 PUCCH resources; When a UCI is detected on a PUCCH resource corresponding to one of the plurality of SR configurations among the M+1 PUCCH resources, it is determined that an SR state of one of the plurality of SR configurations is positive SR.

Optionally, the UCI includes at least one of a hybrid automatic repeat request acknowledgement HARQ-ACK and Channel State Information (CSI). The CRC corresponding to the CSI part1 is scrambled when the UCI includes the CSI, and the CSI consists of the first part CSI (CSI part1)

and the second part CSI (CSI part2). The CSI includes one or more of periodic CSI, aperiodic CSI, and semi-persistent scheduling CSI.

In another embodiment, step 11 may be preceded by further performing the step of determining M+1 Physical Uplink Control Channel (PUCCH) resources corresponding to the Uplink Control Information (UCI) when one of the following conditions is satisfied. Alternatively, the current time is the transmission occasion of the SR, and there are a plurality of SR configurations in the transmission occasion. That is, in the SR transmission occasion, the above operation is performed regardless of whether at least two SR configurations are included in the SR transmission occasion. Alternatively, the above operation is performed in an SR transmission occasion including at least two SR configurations, i.e., only in an SR transmission occasion including at least two SR configurations.

In the information transmission method of the present embodiment, the network device performs UCI detection on the M+1 PUCCH resources corresponding to the UCI, and determines SR states of a plurality of SRs according to the detected PUCCH resources of the UCI, thereby ensuring correct uplink scheduling of the terminal.

The above embodiment describes the information transmission method on the network device side of the embodiment of the present disclosure, and the corresponding network device will be further described with reference to the accompanying drawings.

Figure 5:
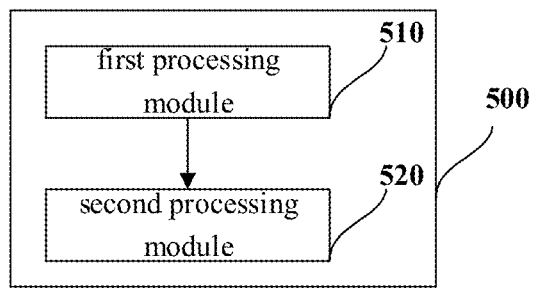
FIG. 5 is a schematic view of a module structure of a network device in an embodiment of the present disclosure.

As shown in FIG. 5, a network device 500 is provided in an embodiment of the present disclosure, including:

a first processing module 510, configured to determine a plurality of Physical Uplink Control Channel (PUCCH) resources corresponding to Uplink Control Information (UCI);

a second processing module 520, configured to detect the UCI in the plurality of PUCCH resources, and determining Scheduling Request (SR) states of a plurality of SR configurations based on the PUCCH resource of the detected UCI.

Optionally, the first processing module 510 includes:

a first processing sub-module, configured to determine the plurality of PUCCH resources corresponding to the UCI based on an initial cyclic shift parameter configured for the UCI.

Optionally, the first processing sub-module includes:

a first processing unit, configured to determine M+1 cyclic shift parameter sets based on the initial cyclic shift parameter configured for the UCI;

where each cyclic shift parameter set includes a plurality of cyclic shift parameters, and each cyclic shift parameter in each cyclic shift parameter set corresponds to a feedback state of the UCI; each cyclic shift parameter in the cyclic shift parameter sets is determined by performing a preset offset based on the initial cyclic shift parameter;

where M is an integer greater than 1, one cyclic shift parameter set of the M+1 cyclic shift parameter sets is for the UCI transmission in the case that the SR states of the plurality of SR configurations are negative SR, and each cyclic shift parameter set of the rest of the M+1 cyclic shift parameter sets is for the UCI transmission in the case that the SR state of the SR configuration corresponding to the each cyclic shift parameter set is positive SR.

Optionally, the second processing module 520 includes:

a first detecting sub-module, configured to detect the UCI using each cyclic shift parameter in the M+1 cyclic shift parameter sets;

a second processing sub-module, configured to in the case that the UCI is detected using the cyclic shift parameter in the cyclic shift parameter set corresponding to negative SR, determine that the SR state of each of the plurality of SR configurations is negative SR;

a third processing sub-module, configured to in the case that the UCI is detected using the cyclic shift parameter in the cyclic shift parameter set corresponding to one SR configuration of the plurality of SR configurations, determine that the SR state of the one SR configuration of the plurality of SR configurations is positive SR.

Optionally, the first processing module 510 further includes:

a fourth processing sub-module, configured to determine M+1 PUCCH resources corresponding to the UCI according to a PUCCH resource indication field in Downlink Control Information (DCI); or a fifth processing sub-module, configured to determine M+1 PUCCH resources from preconfigured J PUCCH resources as the M+1 PUCCH resources, where J is an integer greater than or equal to M+1;

where M is an integer greater than 1, one PUCCH resource of the M+1 PUCCH resources is for the UCI transmission in the case that the SR states of the plurality of SR configurations are negative SR, and each PUCCH resource of the rest of the M+1 PUCCH resources is for the UCI transmission in the case that the SR state of the SR configuration corresponding to the each PUCCH resource is positive SR.

Optionally, the fourth processing sub-module includes:

a second processing unit, configured to determine the M+1 PUCCH resources from a preset PUCCH resource set according to the PUCCH resource indication field in the DCI.

Optionally, the second processing unit includes:

a first processing sub-unit, configured to, in the case that the PUCCH resource indication field indicates that the UCI corresponds to a kth PUCCH resource in the PUCCH resource set, determine the kth PUCCH resource and a ((k+i) mod N)th PUCCH resource in the PUCCH resource set as the M+1 PUCCH resources, or determine the kth PUCCH resource and a ((k+4+i) mod N)th PUCCH resource in the PUCCH resource set as the M+1 PUCCH resources;

where i is an integer greater than 0 and less than or equal to M, and N is a quantity of PUCCH resources in the PUCCH resource set.

Optionally, the second processing unit further includes:

in the case that the PUCCH resource indication field indicates one PUCCH resource subset in the PUCCH resource set, where the PUCCH resource subset includes more than one PUCCH resource;

a second processing sub-unit, configured to, in the case that a quantity of the PUCCH resources in the PUCCH resource subset is less than M+1, determine the M+1 PUCCH resources from the one PUCCH resource subset and the subsequent one or more PUCCH resource subsets, in an order from the PUCCH resources in the one PUCCH resource subset to the PUCCH resources in the subsequent one or more PUCCH resource subsets;

a third processing sub-unit, configured to, in the case that the quantity of the PUCCH resources in the PUCCH resource subset is equal to M+1, determine the PUCCH resources in the PUCCH resource subset as the M+1 PUCCH resources;

a fourth processing sub-unit, configured to, in the case that the quantity of the PUCCH resources in the PUCCH resource subset is greater than M+1, determine the M+1 PUCCH resources from the PUCCH resource subset.

Optionally, the J PUCCH resources are configured by a high layer signaling, or the J PUCCH resources are determined from a plurality of PUCCH resource sets preconfigured by a high layer signaling according to a bit quantity of the UCI.

Optionally, a correspondence between the M+1 cyclic shift parameter sets and the negative SR state and the positive SR state of each of the plurality of SR configurations is predefined, or configured by the network device, or determined according to a preset rule.

Optionally, a correspondence between the M+1 PUCCH resources and the negative SR state and the positive SR state of each of the plurality of SR configurations is predefined, or determined by the network device and notified to a terminal, or determined according to a preset rule.

Optionally, the second processing module 520 further includes:

a sixth processing sub-module, configured to, in the case that the UCI is detected on the PUCCH resource corresponding to negative SR in the M+1 PUCCH resources, determine that the SR state of each of the plurality of SR configurations is negative SR;

a sixth processing sub-module, configured to, in the case that the UCI is detected on the PUCCH resource corresponding to one SR configuration of the plurality of SR configurations in the M+1 PUCCH resources, determine that the SR state of the one SR configuration of the plurality of SR configurations is positive SR.

Optionally, the M is determined according to one of:

a maximum quantity of SR configurations supported by a terminal;

a quantity of SR configurations configured for the terminal;

a quantity of SR configurations overlapped in a same SR transmission occasion configured for the terminal; and a quantity indicated through a configuration signaling sent by the network device.

Optionally, the UCI includes at least one of:

a Hybrid Automatic Repeat reQuest-ACKnowledgement (HARQ-ACK) and Channel State Information (CSI).

Optionally, the network device further includes:

a third processing module, configured to determine the M+1 PUCCH resources corresponding to the UCI, in the case that:

a current time is a transmission occasion of SR; or a current time is a transmission occasion of SR, and there exist a plurality of SR configurations in the transmission occasion.

The network device embodiment of the present disclosure corresponds to the above-described method embodiment. All the implementation means in the above-described method embodiment are applicable to the embodiment of the network device, and the same technical effect can also be achieved. The network device performs UCI detection on M+1 PUCCH resources corresponding to the UCI, and determines SR states of a plurality of SRs according to the detected PUCCH resources of the UCI, thereby ensuring correct uplink scheduling of the terminal.

Figure 6:
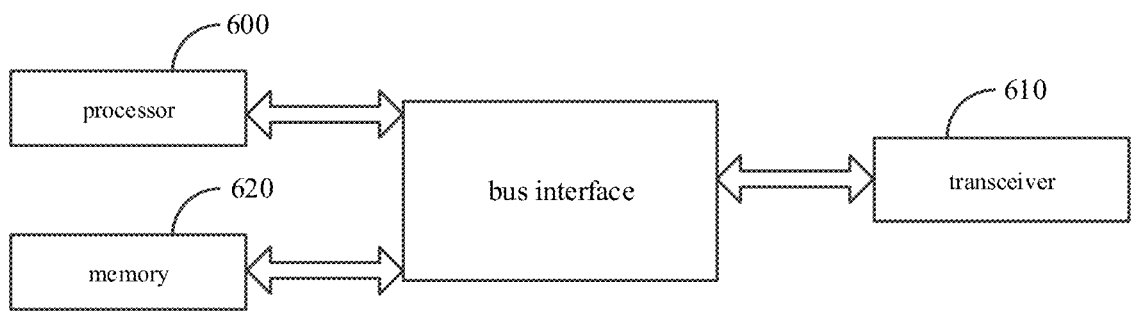
FIG. 6 is a schematic view of a network device in an embodiment of the present disclosure.

In order to better achieve the above object, as shown in FIG. 6, a network device is further provided in an embodiment of the present disclosure, including a processor 600, a memory 620 connected to the processor 600 through a bus interface, and a transceiver 610 connected to the processor 600 through the bus interface; The memory 620 is configured to store programs and data used by the processor in performing operations; transmitting data information or pilots through the transceiver 610, and receiving an uplink control channel through the transceiver 610; When the processor 600 invokes and executes the programs and data stored in the memory 620, the following functions are implemented.

The processor 600 is configured to read a program in the memory 620 to determine a plurality of Physical Uplink Control Channel (PUCCH) resources corresponding to Uplink Control Information (UCI);

detect the UCI in the plurality of PUCCH resources, and determining Scheduling Request (SR) states of a plurality of SR configurations based on the PUCCH resource of the detected UCI.

A transceiver 610 for receiving and transmitting data under the control of the processor 600.

Optionally, the processor 600 executes the computer program to:

determine the plurality of PUCCH resources corresponding to the UCI based on an initial cyclic shift parameter configured for the UCI.

Optionally, the processor 600 executes the computer program to:

determine M+1 cyclic shift parameter sets based on the initial cyclic shift parameter configured for the UCI;

where each cyclic shift parameter set includes a plurality of cyclic shift parameters, and each cyclic shift parameter in each cyclic shift parameter set corresponds to a feedback state of the UCI; each cyclic shift parameter in the cyclic shift parameter sets is determined by performing a preset offset based on the initial cyclic shift parameter;

where M is an integer greater than 1, one cyclic shift parameter set of the M+1 cyclic shift parameter sets is for the UCI transmission in the case that the SR states of the plurality of SR configurations are negative SR, and each cyclic shift parameter set of the rest of the M+1 cyclic shift parameter sets is for the UCI transmission in the case that the SR state of the SR configuration corresponding to the each cyclic shift parameter set is positive SR.

Optionally, the processor 600 executes the computer program to:

detect the UCI using each cyclic shift parameter in the M+1 cyclic shift parameter sets;

in the case that the UCI is detected using the cyclic shift parameter in the cyclic shift parameter set corresponding to negative SR, determine that the SR state of each of the plurality of SR configurations is negative SR;

in the case that the UCI is detected using the cyclic shift parameter in the cyclic shift parameter set corresponding to one SR configuration of the plurality of SR configurations, determine that the SR state of the one SR configuration of the plurality of SR configurations is positive SR.

Optionally, the processor 600 executes the computer program to:

determine M+1 PUCCH resources corresponding to the UCI according to a PUCCH resource indication field in Downlink Control Information (DCI); or determine M+1 PUCCH resources from preconfigured J PUCCH resources as the M+1 PUCCH resources, where J is an integer greater than or equal to M+1;

where M is an integer greater than 1, one PUCCH resource of the M+1 PUCCH resources is for the UCI transmission in the case that the SR states of the plurality of SR configurations are negative SR, and each PUCCH resource of the rest of the M+1 PUCCH resources is for the UCI transmission in the case that the SR state of the SR configuration corresponding to the each PUCCH resource is positive SR.

Optionally, the processor 600 executes the computer program to:

determine the M+1 PUCCH resources from a preset PUCCH resource set according to the PUCCH resource indication field in the DCI.

Optionally, the processor 600 executes the computer program to:

in the case that the PUCCH resource indication field indicates that the UCI corresponds to a kth PUCCH resource in the PUCCH resource set, determine the kth PUCCH resource and a ((k+i) mod N)th PUCCH resource in the PUCCH resource set as the M+1 PUCCH resources, or determine the kth PUCCH resource and a ((k+4+i) mod N)th PUCCH resource in the PUCCH resource set as the M+1 PUCCH resources;

where i is an integer greater than 0 and less than or equal to M, and N is a quantity of PUCCH resources in the PUCCH resource set.

Optionally, the processor 600 executes the computer program to:

in the case that the PUCCH resource indication field indicates one PUCCH resource subset in the PUCCH resource set, where the PUCCH resource subset includes more than one PUCCH resource;

in the case that a quantity of the PUCCH resources in the PUCCH resource subset is less than M+1, determine the M+1 PUCCH resources from the one PUCCH resource subset and the subsequent one or more PUCCH resource subsets, in an order from the PUCCH resources in the one PUCCH resource subset to the PUCCH resources in the subsequent one or more PUCCH resource subsets;

in the case that the quantity of the PUCCH resources in the PUCCH resource subset is equal to M+1, determine the PUCCH resources in the PUCCH resource subset as the M+1 PUCCH resources;

in the case that the quantity of the PUCCH resources in the PUCCH resource subset is greater than M+1, determine the M+1 PUCCH resources from the PUCCH resource subset.

Optionally, the J PUCCH resources are configured by a high layer signaling, or the J PUCCH resources are determined from a plurality of PUCCH resource sets preconfigured by a high layer signaling according to a bit quantity of the UCI.

Optionally, a correspondence between the M+1 cyclic shift parameter sets and the negative SR state and the positive SR state of each of the plurality of SR configurations is predefined, or configured by the network device, or determined according to a preset rule.

Optionally, a correspondence between the M+1 PUCCH resources and the negative SR state and the positive SR state of each of the plurality of SR configurations is predefined, or determined by the network device and notified to a terminal, or determined according to a preset rule.

Optionally, the processor 600 executes the computer program to:

in the case that the UCI is detected on the PUCCH resource corresponding to negative SR in the M+1 PUCCH resources, determine that the SR state of each of the plurality of SR configurations is negative SR;

in the case that the UCI is detected on the PUCCH resource corresponding to one SR configuration of the plurality of SR configurations in the M+1 PUCCH resources, determine that the SR state of the one SR configuration of the plurality of SR configurations is positive SR.

Optionally, the M is determined according to one of:

a maximum quantity of SR configurations supported by a terminal;

a quantity of SR configurations configured for the terminal;

a quantity of SR configurations overlapped in a same SR transmission occasion configured for the terminal; and a quantity indicated through a configuration signaling sent by the network device.

Optionally, the UCI includes at least one of:

a Hybrid Automatic Repeat reQuest-ACKnowledgement (HARQ-ACK) and Channel State Information (CSI).

Optionally, the processor 600 executes the computer program to:

determine the M+1 PUCCH resources corresponding to the UCI, in the case that:

a current time is a transmission occasion of SR; or a current time is a transmission occasion of SR, and there exist a plurality of SR configurations in the transmission occasion.

In FIG. 6, the bus architecture may include any number of interconnected buses and bridges, specifically, one or more processors represented by the processor 600 and various circuits of the memory represented by the memory 620 are linked together. The bus architecture may also link various other circuits, such as peripherals, voltage regulators, and power management circuits, all of which are well known in the art and therefore will not be described further herein. The bus interface provides an interface. Transceiver 610 may be a plurality of elements, including a transmitter and a transceiver, providing units for communicating with various other devices on a transmission medium. The processor 600 is responsible for managing the bus architecture and general processing, and the memory 620 may store data used by the processor 600 in performing operations.

It will be appreciated by those skilled in the art that all or a portion of the steps of the embodiments described above may be performed by hardware or may be indicated by a computer program including instructions for performing some or all of the steps of the methods described above; And the computer program may be stored in a readable storage medium, which may be any form of storage medium.

It will be appreciated by those skilled in the art that all or a portion of the steps of the embodiments described above may be performed by hardware or may be indicated by a computer program including instructions for performing some or all of the steps of the methods described above; And the computer program may be stored in a readable storage medium, which may be any form of storage medium.

Furthermore, it should be noted that in the apparatus and methods of the present disclosure, it is evident that the components or steps may be broken down and/or recombined. Such decomposition and/or recombination is to be considered an equivalent of the present disclosure. Moreover, the steps of performing the above-mentioned series of processes may be naturally performed in chronological order in the order described, but it is not necessary to perform the steps necessarily in chronological order, and certain steps may be performed in parallel or independently of each other. It will be appreciated by those of ordinary skill in the art that all or any of the steps or components of the methods and apparatus of the present disclosure may be implemented in hardware, firmware, software, or combinations thereof in any computing device (including a processor, storage medium, etc.) or network of computing devices, as may be accomplished by those of ordinary skill in the art upon reading the description of the present disclosure using their basic programming skills.

The object of the present disclosure can therefore also be achieved by running a program or a set of programs on any computing device. The computing device may be a well-known universal device. Accordingly, the object of the present disclosure may also be achieved by providing a program product containing only program code embodying the method or apparatus. That is, such a program product also constitutes the present disclosure, and a storage medium in which such a program product is stored also constitutes the present disclosure. Obviously, the storage medium may be any known storage medium or any storage medium developed in the future. It should also be noted that in the apparatus and methods of the present disclosure, it will be apparent that the components or steps may be broken down and/or recombined. Such decomposition and/or recombination is to be considered an equivalent of the present disclosure. Moreover, the steps of performing the above-mentioned series of processing may be performed in a chronological order naturally in the order described, but need not necessarily be performed in a chronological order. Certain steps may be performed in parallel or independently of one another.

The foregoing are some embodiments of the present disclosure, it should be noted that several modifications and embellishments may be made by those of ordinary skill in the art without departing from the principles set forth herein, and such modifications and embellishments are also considered to be within the scope of the present disclosure.

What is claimed is:

1. An information transmission method, applied to a terminal, comprising:
   determining a plurality of Physical Uplink Control Channel (PUCCH) resources corresponding to Uplink Control Information (UCI);
   determining a target PUCCH resource for a UCI transmission from the plurality of PUCCH resources, according to Scheduling Request (SR) states of a plurality of SR configurations; and
   sending the UCI through the target PUCCH resource;
   wherein the UCI comprises at least one of:
   a Hybrid Automatic Repeat reOuest-ACKnowledgement (HARO-ACK) or Channel State Information (CSI);
   wherein the determining the plurality of PUCCH resources corresponding to the UCI comprises one of the following methods:
   Method 1: determining the plurality of PUCCH resources corresponding to the UCI based on an initial cyclic shift parameter configured for the UCI;
   Method 2: determining M+1 PUCCH resources corresponding to the UCI according to a PUCCH resource indication field in Downlink Control Information (DCI);
   Method 3: determining M+1 PUCCH resources from preconfigured J PUCCH resources as the M+1 PUCCH resources, wherein J is an integer greater than or equal to M+1;
   wherein for Methods 2 and 3, M is an integer greater than 1, one PUCCH resource of the M+1 PUCCH resources is for the UCI transmission in the case that the SR states of the plurality of SR configurations are negative SR, and each PUCCH resource of the rest of the M+1 PUCCH resources is for the UCI transmission in the case that the SR state of the SR configuration corresponding to the each PUCCH resource is positive SR;
   wherein the J PUCCH resources are configured by a high layer signaling, or the J PUCCH resources are determined from a plurality of PUCCH resource sets preconfigured by a high layer signaling according to a bit quantity of the UCI;
   wherein in using Method 1, the determining the plurality of PUCCH resources corresponding to the UCI based on the initial cyclic shift parameter configured for the UCI comprises:
   determining M+1 cyclic shift parameter sets based on the initial cyclic shift parameter configured for the UCI;
   wherein each cyclic shift parameter set comprises a plurality of cyclic shift parameters, and each cyclic shift parameter in each cyclic shift parameter set corresponds to a feedback state of the UCI;
   wherein each cyclic shift parameter in the cyclic shift parameter sets is determined by performing a preset offset based on the initial cyclic shift parameter;
   wherein M is an integer greater than 1, one cyclic shift parameter set of the M+1 cyclic shift parameter sets is for the UCI transmission in the case that the SR states of the plurality of SR configurations are negative SR, and each cyclic shift parameter set of the rest of the M+1 cyclic shift parameter sets is for the UCI transmission in the case that the SR state of the SR configuration corresponding to the each cyclic shift parameter set is positive SR.

2. The information transmission method according to claim 1,
   wherein in case that the Method 2 is used, the determining the M+1 PUCCH resources corresponding to the UCI according to the PUCCH resource indication field in the DCI comprises:
   determining the M+1 PUCCH resources from a preset PUCCH resource set according to the PUCCH resource indication field in the DCI;
   wherein the determining the M+1 PUCCH resources from the preset PUCCH resource set according to the PUCCH resource indication field in the DCI comprises:
   in the case that the PUCCH resource indication field indicates that the UCI corresponds to a $k^{th}$ PUCCH resource in the PUCCH resource set,
   determining the $k^{th}$ PUCCH resource and a $((k+i) \mod N)^{th}$ PUCCH resource in the PUCCH resource set as the M+1 PUCCH resources, or
   determining the $k^{th}$ PUCCH resource and a $((k+4+i) \mod N)^{th}$ PUCCH resource in the PUCCH resource set as the M+1 PUCCH resources;
   where i is an integer greater than 0 and less than or equal to M, and N is a quantity of PUCCH resources in the PUCCH resource set;
   or,
   the determining the M+1 PUCCH resources corresponding to the UCI according to the PUCCH resource indication field in the DCI comprises:
   in the case that the PUCCH resource indication field indicates one PUCCH resource subset in the PUCCH resource set, wherein the PUCCH resource subset comprises more than one PUCCH resource;
   in the case that a quantity of the PUCCH resources in the PUCCH resource subset is less than M+1, determining the M+1 PUCCH resources from the one PUCCH resource subset and the subsequent one or more PUCCH resource subsets, in an order from the PUCCH resources in the one PUCCH resource subset to the PUCCH resources in the subsequent one or more PUCCH resource subsets;

in the case that the quantity of the PUCCH resources in the PUCCH resource subset is equal to M+1, determining the PUCCH resources in the PUCCH resource subset as the M+1 PUCCH resources;

in the case that the quantity of the PUCCH resources in the PUCCH resource subset is greater than M+1, determining the M+1 PUCCH resources from the PUCCH resource subset.

3. The information transmission method according to claim 2, wherein in the case that the Method 1 is used, the determining the target PUCCH resource for the UCI transmission from the plurality of PUCCH resources according to the SR states of the plurality of SR configurations comprises:

in the case that the SR state of each of the plurality of SR configurations is negative SR, determining the cyclic shift parameter set corresponding to negative SR among the M+1 cyclic shift parameter sets as a target cyclic shift parameter set for the UCI transmission;

in the case that the SR state of one SR configuration of the plurality of SR configurations is positive SR, determining the cyclic shift parameter set corresponding to the one SR configuration among the M+1 cyclic shift parameter sets as a target cyclic shift parameter set for the UCI transmission;

in the case that the Method 2 or Method 3 is used, the determining the target PUCCH resource for the UCI transmission from the M+1 PUCCH resources according to the SR states of the plurality of SR configurations comprises:

in the case that the SR state of each of the plurality of SR configurations is negative SR, determining the PUCCH resource corresponding to negative SR in the M+1 PUCCH resources as the target PUCCH resource for the UCI transmission;

in the case that the SR state of one SR configuration of the plurality of SR configurations is positive SR, determining the PUCCH resource corresponding to the one SR configuration in the M+1 PUCCH resources as the target PUCCH resource for the UCI transmission.

4. The information transmission method according to claim 2, wherein in the case that the Method 1 is used, a correspondence between the M+1 cyclic shift parameter sets and the negative SR state and the positive SR state of each of the plurality of SR configurations is predefined, or configured by a network device, or determined according to a preset rule;

in the case that the Method 2 or Method 3 is used, a correspondence between the M+1 PUCCH resources and the negative SR state and the positive SR state of each of the plurality of SR configurations is predefined, or configured by a network device, or determined according to a preset rule;

the M is determined according to one of:

a maximum quantity of SR configurations supported by the terminal;

a quantity of SR configurations configured for the terminal;

a quantity of SR configurations overlapped in a same SR transmission occasion configured for the terminal; and a quantity indicated through a configuration signaling sent by a network device.

5. The information transmission method according to claim 1, further comprising:

determining the plurality of PUCCH resources corresponding to the UCI, in the case that:

a current time is a transmission occasion of SR; or a current time is a transmission occasion of SR, and there exist a plurality of SR configurations in the transmission occasion.

6. A terminal, comprising: a transceiver, a memory, a processor and a program stored in the memory and executable on the processor, wherein the processor is configured to execute the program to:

determine a plurality of Physical Uplink Control Channel (PUCCH) resources corresponding to Uplink Control Information (UCI);

determine a target PUCCH resource for a UCI transmission from the plurality of PUCCH resources, according to Scheduling Request (SR) states of a plurality of SR configurations; and send the UCI through the target PUCCH resource;

wherein the UCI comprises at least one of:

a Hybrid Automatic Repeat reOuest-ACKnowledgement (HARO-ACK) or Channel State Information (CSI);

wherein the processor is configured to execute the program to perform one of the following methods:

Method 1: determining the plurality of PUCCH resources corresponding to the UCI based on an initial cyclic shift parameter configured for the UCI;

Method 2: determining M+1 PUCCH resources corresponding to the UCI according to a PUCCH resource indication field in Downlink Control Information (DCI);

Method 3: determining M+1 PUCCH resources from preconfigured J PUCCH resources as the M+1 PUCCH resources, wherein J is an integer greater than or equal to M+1;

wherein for Methods 2 and 3, M is an integer greater than 1, one PUCCH resource of the M+1 PUCCH resources is for the UCI transmission in the case that the SR states of the plurality of SR configurations are negative SR, and each PUCCH resource of the rest of the M+1 PUCCH resources is for the UCI transmission in the case that the SR state of the SR configuration corresponding to the each PUCCH resource is positive SR;

wherein the J PUCCH resources are configured by a high layer signaling, or the J PUCCH resources are determined from a plurality of PUCCH resource sets preconfigured by a high layer signaling according to a bit quantity of the UCI;

wherein in using Method 1, the processor is configured to execute the program to perform:

determining M+1 cyclic shift parameter sets based on the initial cyclic shift parameter configured for the UCI;

wherein each cyclic shift parameter set comprises a plurality of cyclic shift parameters, and each cyclic shift parameter in each cyclic shift parameter set corresponds to a feedback state of the UCI;

wherein each cyclic shift parameter in the cyclic shift parameter sets is determined by performing a preset offset based on the initial cyclic shift parameter;

wherein M is an integer greater than 1, one cyclic shift parameter set of the M+1 cyclic shift parameter sets is for the UCI transmission in the case that the SR states of the plurality of SR configurations are negative SR, and each cyclic shift parameter set of the rest of the M+1 cyclic shift parameter sets is for the UCI transmission in the case that the SR state of the SR configuration corresponding to the each cyclic shift parameter set is positive SR.

37

7. The terminal according to claim 6, wherein
in case that the processor is configured to execute the program the Method 2, the processor is configured to execute the program to:
determine the M+1 PUCCH resources from a preset PUCCH resource set according to the PUCCH resource indication field in the DCI;
wherein the processor is configured to execute the program to:
in the case that the PUCCH resource indication field indicates that the UCI corresponds to a $k^{th}$ PUCCH resource in the PUCCH resource set,
determine the $k^{th}$ PUCCH resource and a $((k+i) \bmod N)^{th}$ PUCCH resource in the PUCCH resource set as the M+1 PUCCH resources, or
determine the $k^{th}$ PUCCH resource and a $((k+4+i) \bmod N)^{th}$ PUCCH resource in the PUCCH resource set as the M+1 PUCCH resources;
where i is an integer greater than 0 and less than or equal to M, and N is a quantity of PUCCH resources in the PUCCH resource set;
or,
the processor is configured to execute the program to:
in the case that the PUCCH resource indication field indicates one PUCCH resource subset in the PUCCH resource set, wherein the PUCCH resource subset comprises more than one PUCCH resource;
in the case that a quantity of the PUCCH resources in the PUCCH resource subset is less than M+1, determine the M+1 PUCCH resources from the one PUCCH resource subset and the subsequent one or more PUCCH resource subsets, in an order from the PUCCH resources in the one PUCCH resource subset to the PUCCH resources in the subsequent one or more PUCCH resource subsets;
in the case that the quantity of the PUCCH resources in the PUCCH resource subset is equal to M+1, determine the PUCCH resources in the PUCCH resource subset as the M+1 PUCCH resources;
in the case that the quantity of the PUCCH resources in the PUCCH resource subset is greater than M+1, determine the M+1 PUCCH resources from the PUCCH resource subset.

8. The terminal according to claim 7, wherein in the case that the processor is configured to execute the program to perform the Method 1, the processor is configured to execute the program to:
in the case that the SR state of each of the plurality of SR configurations is negative SR, determine the cyclic shift parameter set corresponding to negative SR among the M+1 cyclic shift parameter sets as a target cyclic shift parameter set for the UCI transmission;
in the case that the SR state of one SR configuration of the plurality of SR configurations is positive SR, determine the cyclic shift parameter set corresponding to the one SR configuration among the M+1 cyclic shift parameter sets as a target cyclic shift parameter set for the UCI transmission;
in the case that the processor is configured to execute the program to perform the Method 2 or Method, the processor is configured to execute the program to:
in the case that the SR state of each of the plurality of SR configurations is negative SR, determine the PUCCH resource corresponding to negative SR in the M+1 PUCCH resources as the target PUCCH resource for the UCI transmission;

38 in the case that the SR state of one SR configuration of the plurality of SR configurations is positive SR, determine the PUCCH resource corresponding to the one SR configuration in the M+1 PUCCH resources as the target PUCCH resource for the UCI transmission.

9. The terminal according to claim 7, wherein in the case that the processor is configured to execute the program to perform the Method, a correspondence between the M+1 cyclic shift parameter sets and the negative SR state and the positive SR state of each of the plurality of SR configurations is predefined, or configured by a network device, or determined according to a preset rule;
in the case that the processor is configured to execute the program to perform the Method 2 or Method 3, a correspondence between the M+1 PUCCH resources and the negative SR state and the positive SR state of each of the plurality of SR configurations is predefined, or configured by a network device, or determined according to a preset rule;
the M is determined according to one of:
a maximum quantity of SR configurations supported by the terminal;
a quantity of SR configurations configured for the terminal;
a quantity of SR configurations overlapped in a same SR transmission occasion configured for the terminal; and
a quantity indicated through a configuration signaling sent by a network device.

10. The terminal according to claim 6, wherein the processor is configured to execute the program to:
determine the plurality of PUCCH resources corresponding to the UCI, in the case that:
a current time is a transmission occasion of SR; or
a current time is a transmission occasion of SR, and there exist a plurality of SR configurations in the transmission occasion.

11. An information transmission method, applied to a network device, comprising:
determining a plurality of Physical Uplink Control Channel (PUCCH) resources corresponding to Uplink Control Information (UCI); and
detecting the UCI in the plurality of PUCCH resource, and determining Scheduling Request (SR) states of a plurality of SR configurations based on the PUCCH resource of the detected UCI;
wherein the UCI comprises at least one of:
a Hybrid Automatic Repeat reQuest-ACKnowledgement (HARQ-ACK) or Channel State Information (CSI);
wherein the determining the plurality of PUCCH resources corresponding to the UCI comprises one of the following methods:
Method 1: determining the plurality of PUCCH resources corresponding to the UCI based on an initial cyclic shift parameter configured for the UCI;
Method 2: determining M+1 PUCCH resources corresponding to the UCI according to a PUCCH resource indication field in Downlink Control Information (DCI);
Method 3: determining M+1 PUCCH resources from preconfigured J PUCCH resources as the M+1 PUCCH resources, wherein J is an integer greater than or equal to M+1;
wherein for Methods 2 and 3, M is an integer greater than 1, one PUCCH resource of the M+1 PUCCH resources is for the UCI transmission in the case that the SR states of the plurality of SR configurations are negative SR, and each PUCCH resource of the rest of the M+1

PUCCH resources is for the UCI transmission in the case that the SR state of the SR configuration corresponding to the each PUCCH resource is positive SR;

wherein the J PUCCH resources are configured by a high layer signaling, or the J PUCCH resources are determined from a plurality of PUCCH resource sets preconfigured by a high layer signaling according to a bit quantity of the UCI;

wherein in using Method 1, the determining the plurality of PUCCH resources corresponding to the UCI based on the initial cyclic shift parameter configured for the UCI comprises:

determining M+1 cyclic shift parameter sets based on the initial cyclic shift parameter configured for the UCI;

wherein each cyclic shift parameter set comprises a plurality of cyclic shift parameters, and each cyclic shift parameter in each cyclic shift parameter set corresponds to a feedback state of the UCI;

wherein each cyclic shift parameter in the cyclic shift parameter sets is determined by performing a preset offset based on the initial cyclic shift parameter;

wherein M is an integer greater than 1, one cyclic shift parameter set of the M+1 cyclic shift parameter sets is for the UCI transmission in the case that the SR states of the plurality of SR configurations are negative SR, and each cyclic shift parameter set of the rest of the M+1 cyclic shift parameter sets is for the UCI transmission in the case that the SR state of the SR configuration corresponding to the each cyclic shift parameter set is positive SR.

12. The information transmission method according to claim 11, wherein
in the case that the Method 2 is used, wherein the determining the M+1 PUCCH resources corresponding to the UCI according to the PUCCH resource indication field in the DCI comprises:
determining the M+1 PUCCH resources from a preset PUCCH resource set according to the PUCCH resource indication field in the DCI;
the determining the M+1 PUCCH resources from the preset PUCCH resource set according to the PUCCH resource indication field in the DCI comprises:
in the case that the PUCCH resource indication field indicates that the UCI corresponds to a $k^{th}$ PUCCH resource in the PUCCH resource set,
determining the $k^{th}$ PUCCH resource and a $((k+i) \mod N)^{th}$ PUCCH resource in the PUCCH resource set as the M+1 PUCCH resources, or
determining the $k^{th}$ PUCCH resource and a $((k+4+i) \mod N)^{th}$ PUCCH resource in the PUCCH resource set as the M+1 PUCCH resources;
where i is an integer greater than 0 and less than or equal to M, and N is a quantity of PUCCH resources in the PUCCH resource set;
or,
the determining the M+1 PUCCH resources corresponding to the UCI according to the PUCCH resource indication field in the DCI comprises:
in the case that the PUCCH resource indication field indicates one PUCCH resource subset in the PUCCH resource set, wherein the PUCCH resource subset comprises more than one PUCCH resource;
in the case that a quantity of the PUCCH resources in the PUCCH resource subset is less than M+1, determining the M+1 PUCCH resources from the one PUCCH resource subset and the subsequent one or more PUCCH resource subsets, in an order from the PUCCH resources in the one PUCCH resource subset to the PUCCH resources in the subsequent one or more PUCCH resource subsets;
in the case that the quantity of the PUCCH resources in the PUCCH resource subset is equal to M+1, determining the PUCCH resources in the PUCCH resource subset as the M+1 PUCCH resources;
in the case that the quantity of the PUCCH resources in the PUCCH resource subset is greater than M+1, determining the M+1 PUCCH resources from the PUCCH resource subset.

13. The information transmission method according to claim 12, wherein in the case that the Method 1 is used, the detecting the UCI in the plurality of PUCCH resource and determining the SR states of the plurality of SR configurations based on the PUCCH resource of the detected UCI comprises:
detecting the UCI using each cyclic shift parameter in the M+1 cyclic shift parameter sets;
in the case that the UCI is detected using the cyclic shift parameter in the cyclic shift parameter set corresponding to negative SR, determining that the SR state of each of the plurality of SR configurations is negative SR;
in the case that the UCI is detected using the cyclic shift parameter in the cyclic shift parameter set corresponding to one SR configuration of the plurality of SR configurations, determining that the SR state of the one SR configuration of the plurality of SR configurations is positive SR;
in the case that the Method 2 or Method 3 is used, the detecting the UCI in the M+1 PUCCH resources and determining the SR states of the plurality of SR configurations based on the PUCCH resource of the detected UCI comprises:
in the case that the UCI is detected on the PUCCH resource corresponding to negative SR in the M+1 PUCCH resources, determining that the SR state of each of the plurality of SR configurations is negative SR;
in the case that the UCI is detected on the PUCCH resource corresponding to one SR configuration of the plurality of SR configurations in the M+1 PUCCH resources, determining that the SR state of the one SR configuration of the plurality of SR configurations is positive SR.

14. The information transmission method according to claim 12, wherein in the case that the Method 1 is used, a correspondence between the M+1 cyclic shift parameter sets and the negative SR state and the positive SR state of each of the plurality of SR configurations is predefined, or configured by the network device, or determined according to a preset rule;
in the case that the Method 2 or Method 3 is used, a correspondence between the M+1 PUCCH resources and the negative SR state and the positive SR state of each of the plurality of SR configurations is predefined, or determined by the network device and notified to a terminal, or determined according to a preset rule;
the M is determined according to one of:
a maximum quantity of SR configurations supported by a terminal;
a quantity of SR configurations configured for the terminal;
a quantity of SR configurations overlapped in a same SR transmission occasion configured for the terminal; and a quantity indicated through a configuration signaling sent by the network device.

15. The information transmission method according to claim 11, further comprising:
determining the plurality of PUCCH resources corresponding to the UCI, in the case that:
a current time is a transmission occasion of SR; or
a current time is a transmission occasion of SR, and there exist a plurality of SR configurations in the transmission occasion.

16. A network device, comprising: a transceiver, a memory, a processor and a program stored in the memory and executable on the processor, wherein the processor is configured to execute the program to:
determine a plurality of Physical Uplink Control Channel (PUCCH) resources corresponding to Uplink Control Information (UCI); and
detect the UCI in the plurality of PUCCH resources, and determine Scheduling Request (SR) states of a plurality of SR configurations based on the PUCCH resource of the detected UCI;
wherein the UCI comprises at least one of:
a Hybrid Automatic Repeat reOuest-ACKnowledgement (HARO-ACK) or Channel State Information (CSI);
wherein the processor is configured to execute the program to perform one of the following methods:
Method 1: determining the plurality of PUCCH resources corresponding to the UCI based on an initial cyclic shift parameter configured for the UCI;
Method 2: determining M+1 PUCCH resources corresponding to the UCI according to a PUCCH resource indication field in Downlink Control Information (DCI);
Method 3: determining M+1 PUCCH resources from preconfigured J PUCCH resources as the M+1 PUCCH resources, wherein J is an integer greater than or equal to M+1;
wherein for Methods 2 and 3, M is an integer greater than 1, one PUCCH resource of the M+1 PUCCH resources is for the UCI transmission in the case that the SR states of the plurality of SR configurations are negative SR, and each PUCCH resource of the rest of the M+1 PUCCH resources is for the UCI transmission in the case that the SR state of the SR configuration corresponding to the each PUCCH resource is positive SR;
wherein the J PUCCH resources are configured by a high layer signaling, or the J PUCCH resources are determined from a plurality of PUCCH resource sets preconfigured by a high layer signaling according to a bit quantity of the UCI;
wherein in using Method 1, the processor is configured to execute the program to perform:
determining M+1 cyclic shift parameter sets based on the initial cyclic shift parameter configured for the UCI;
wherein each cyclic shift parameter set comprises a plurality of cyclic shift parameters, and each cyclic shift parameter in each cyclic shift parameter set corresponds to a feedback state of the UCI;
wherein each cyclic shift parameter in the cyclic shift parameter sets is determined by performing a preset offset based on the initial cyclic shift parameter;
wherein M is an integer greater than 1, one cyclic shift parameter set of the M+1 cyclic shift parameter sets is for the UCI transmission in the case that the SR states of the plurality of SR configurations are negative SR, and each cyclic shift parameter set of the rest of the M+1 cyclic shift parameter sets is for the UCI transmission in the case that the SR state of the SR configuration corresponding to the each cyclic shift parameter set is positive SR.

17. The network device according to claim 16, wherein in the case that the processor is configured to execute the program to perform the Method 2, the processor is configured to execute the program to:
determine the M+1 PUCCH resources from a preset PUCCH resource set according to the PUCCH resource indication field in the DCI;
the processor is configured to execute the program to:
in the case that the PUCCH resource indication field indicates that the UCI corresponds to a $k^{th}$ PUCCH resource in the PUCCH resource set,
determine the $k^{th}$ PUCCH resource and a $((k+i) \mod N)^{th}$ PUCCH resource in the PUCCH resource set as the M+1 PUCCH resources, or
determine the $k^{th}$ PUCCH resource and a $((k+4+i) \mod N)^{th}$ PUCCH resource in the PUCCH resource set as the M+1 PUCCH resources;
where i is an integer greater than 0 and less than or equal to M, and N is a quantity of PUCCH resources in the PUCCH resource set;
or,
the processor is configured to execute the program to:
in the case that the PUCCH resource indication field indicates one PUCCH resource subset in the PUCCH resource set, wherein the PUCCH resource subset comprises more than one PUCCH resource;
in the case that a quantity of the PUCCH resources in the PUCCH resource subset is less than M+1, determine the M+1 PUCCH resources from the one PUCCH resource subset and the subsequent one or more PUCCH resource subsets, in an order from the PUCCH resources in the one PUCCH resource subset to the PUCCH resources in the subsequent one or more PUCCH resource subsets;
in the case that the quantity of the PUCCH resources in the PUCCH resource subset is equal to M+1, determine the PUCCH resources in the PUCCH resource subset as the M+1 PUCCH resources;
in the case that the quantity of the PUCCH resources in the PUCCH resource subset is greater than M+1, determine the M+1 PUCCH resources from the PUCCH resource subset.

18. The network device according to claim 17, wherein in the case that the processor is configured to execute the program to perform the Method, the processor is configured to execute the program to:
detect the UCI using each cyclic shift parameter in the M+1 cyclic shift parameter sets;
in the case that the UCI is detected using the cyclic shift parameter in the cyclic shift parameter set corresponding to negative SR, determine that the SR state of each of the plurality of SR configurations is negative SR;
in the case that the UCI is detected using the cyclic shift parameter in the cyclic shift parameter set corresponding to one SR configuration of the plurality of SR configurations, determine that the SR state of the one SR configuration of the plurality of SR configurations is positive SR;
in the case that the processor is configured to execute the program to perform the Method 2 or Method, the processor is configured to execute the program to:
in the case that the UCI is detected on the PUCCH resource corresponding to negative SR in the M+1

PUCCH resources, determine that the SR state of each of the plurality of SR configurations is negative SR;

in the case that the UCI is detected on the PUCCH resource corresponding to one SR configuration of the plurality of SR configurations in the M+1 PUCCH resources, determine that the SR state of the one SR configuration of the plurality of SR configurations is positive SR.

19. The network device according to claim 17, wherein in the case that the processor is configured to execute the program to perform the Method, a correspondence between the M+1 cyclic shift parameter sets and the negative SR state and the positive SR state of each of the plurality of SR configurations is predefined, or configured by the network device, or determined according to a preset rule;

in the case that the processor is configured to execute the program to perform the Method 2 or Method 3, a correspondence between the M+1 PUCCH resources and the negative SR state and the positive SR state of each of the plurality of SR configurations is predefined, or determined by the network device and notified to a terminal, or determined according to a preset rule;

the M is determined according to one of:

a maximum quantity of SR configurations supported by a terminal;

a quantity of SR configurations configured for the terminal;

a quantity of SR configurations overlapped in a same SR transmission occasion configured for the terminal; and a quantity indicated through a configuration signaling sent by the network device.

20. The network device according to claim 16, wherein the processor is configured to execute the program to:

determine the plurality of PUCCH resources corresponding to the UCI, in the case that:

a current time is a transmission occasion of SR; or a current time is a transmission occasion of SR, and there exist a plurality of SR configurations in the transmission occasion.

* * * * *